US012390377B2

(12) United States Patent
Alvarez et al.

(10) Patent No.: US 12,390,377 B2
(45) Date of Patent: Aug. 19, 2025

(54) WHEELCHAIR

(71) Applicant: Leaderstat, Ltd., Powell, OH (US)

(72) Inventors: Eleanor Alvarez, Powell, OH (US); Emily Alvarez, Sullivan's Island, SC (US); Benjamin Hubert, Hackney (GB); Mike Starkey, Kent, OH (US)

(73) Assignee: Leaderstat, Ltd., Powell, OH (US)

( * ) Notice: Subject to any disclaimer, the term of this patent is extended or adjusted under 35 U.S.C. 154(b) by 573 days.

(21) Appl. No.: 17/828,909

(22) Filed: May 31, 2022

(65) Prior Publication Data

US 2022/0378633 A1 Dec. 1, 2022

Related U.S. Application Data

(60) Provisional application No. 63/194,712, filed on May 28, 2021.

(51) Int. Cl.
*A61G 5/02* (2006.01)
*A61G 5/08* (2006.01)
*A61G 5/10* (2006.01)

(52) U.S. Cl.
CPC .......... *A61G 5/0875* (2016.11); *A61G 5/1056* (2013.01)

(58) Field of Classification Search
CPC ........ A61G 5/128; A61G 5/08; A61G 5/1059; A61G 5/02; A61G 5/0875; A61G 5/1054; A61G 5/00; A61G 5/0891; A61G 5/10; A61G 5/107; A61G 5/1078; A61G 5/12; A61G 5/127; A61H 3/04; A61H 2203/043
USPC .......................................................... 280/650
See application file for complete search history.

(56) References Cited

U.S. PATENT DOCUMENTS

| | | | | |
|---|---|---|---|---|
| 5,244,223 A * | 9/1993 | Uchiyama | A61G 5/1054 280/42 |
| 7,744,114 B2 * | 6/2010 | Menichini | A61G 5/0833 280/42 |
| 9,801,766 B1 * | 10/2017 | Slagerman | A61G 5/1054 |
| 9,861,549 B2 * | 1/2018 | Karlovich | A63B 22/02 |
| 10,085,903 B1 * | 10/2018 | Ludovici | B60B 33/0071 |
| 11,406,555 B2 * | 8/2022 | Karlovich | A61H 3/008 |
| 11,628,107 B1 * | 4/2023 | Reznikov | A61G 5/127 280/291 |
| 11,865,054 B1 * | 1/2024 | Golden, Jr. | A61G 5/1094 |
| 2007/0283990 A1 * | 12/2007 | Fernandez | A61G 5/128 280/87.041 |
| 2010/0038880 A1 * | 2/2010 | Bagg | A61G 5/02 16/18 R |
| 2010/0194162 A1 * | 8/2010 | Knopf | A61G 5/0866 297/354.12 |

(Continued)

*Primary Examiner* — James A Shriver, II
*Assistant Examiner* — Hilary L Johns
(74) *Attorney, Agent, or Firm* — Standley Law Group LLP; Jeffrey S. Standley; Beverly A. Marsh

(57) ABSTRACT

A wheelchair having a seat assembly and a base assembly. The base assembly includes a central frame, rear wheels, and leg assemblies. The leg assemblies are movable between at least a first position and a second position, which enables the leg assemblies to be stowed away when not in use. The seat assembly includes a seat component, a backrest component, and opposing side structures. The backrest component is connected to, and pivotable about, the side structures such that it may be folded down for storage or reclined for more comfortable sitting. The side structures include adjustable armrest assemblies that enable vertical adjustments of the armrests.

20 Claims, 34 Drawing Sheets

(56) References Cited

U.S. PATENT DOCUMENTS

| | | | | |
|---|---|---|---|---|
| 2015/0048600 A1* | 2/2015 | Brenner | ................. | A61G 5/128 280/657 |
| 2015/0297439 A1* | 10/2015 | Karlovich | ............. | A61H 3/008 280/647 |
| 2020/0281801 A1* | 9/2020 | Karlovich | ................ | A47C 3/20 |

* cited by examiner

WHEELCHAIR

CROSS-REFERENCE TO RELATED APPLICATIONS

This application is a nonprovisional patent application that makes a priority claim to U.S. Provisional Application No. 63/194,712, filed May 28, 2021, which is incorporated by reference in its entirety.

FIELD

Embodiments of the present disclosure relate to mobility devices. More particularly, embodiments relate to wheelchairs that can be configured for a variety of users and purposes and can be easily transported and stored.

BACKGROUND

Wheelchairs are commonly used by individuals with a wide range of mobility disabilities for the main purpose of indoor and/or outdoor locomotion. Wheelchairs may also be used by persons who are temporarily ill or convalescent. Persons who use wheelchairs may still benefit from, and be encouraged to, make use of their legs whenever possible. For example, it may be advised, and preferred by a wheelchair user, to use their feet, when possible, to propel their wheelchair, particularly for shorter distances. Such movement can help maintain muscle tone and stamina, especially for those persons who may spend a significant portion of the day in a wheelchair. Many wheelchairs are not adjustable and are intended to be used for a variety of persons regardless of their height, stature, or mobility. However, comfort and even health may be jeopardized by this conventional one-size-fits-all approach to wheelchairs. Persons who are too tall or too short for a particular wheelchair may experience discomfort, stiffness, and difficulty in moving themselves. Poor wheelchair fit may also have a negative impact on circulation. Moreover, elderly users of wheelchairs commonly suffer from skin tears from the rough surfaces, joints, and fixtures on chairs. Skin ulcers and other skin lesions are also common from being sedentary for too long in a wheelchair.

Conventional wheelchairs are also difficult to transport and take up significant space in storage. Difficulty in transporting a wheelchair may reduce the ability of a user to visit others, attend to errands, or otherwise leave their primary residence.

Accordingly, those skilled in the art continue with research and development efforts in the field of wheelchairs.

SUMMARY OF THE INVENTION

Disclosed are wheelchairs that include a base assembly and a seat assembly.

In one embodiment, the wheelchair includes a base assembly having a central frame that has a forward portion and a rear portion. The base assembly also includes a leg assembly having a leg and a caster wheel subassembly. The leg includes an elongated body that defines a top end and a bottom end. The caster wheel subassembly is connected to the bottom end of the leg. The base assembly also includes a connecting means for connecting the top end of the leg to the forward portion of the central frame. The connecting means provides for the movement of the leg between at least a first position and a second positioned. The location of the caster assembly wheel subassembly is further away from the central frame when the leg is in the first position than when the leg is in the second position. The seat assembly is disposed above and connected to the central frame.

In another embodiment, the wheelchair includes a base assembly having a central frame that has a forward portion and a rear portion. The base assembly also includes a leg assembly having a leg and a caster wheel subassembly. The leg includes an elongated body that defines a top end and a bottom end. The caster wheel subassembly is connected to the bottom end of the leg. The base assembly also includes a connecting means for connecting the top end of the leg to the forward portion of the central frame. The connecting means provides for the movement of the leg between at least a first position and a second positioned. The location of the caster assembly wheel subassembly is further away from the central frame when the leg is in the first position than when the leg is in the second position. The seat assembly includes a seat component disposed above and connected to the central frame. The seat component includes a forward portion and a rear portion. The seat assembly further includes a first side structure and an opposing second side structure, with the first and second side structures being disposed near the rear portion of the seat component. The seat assembly further includes a backrest component disposed between the first side structure and the second side structure. The backrest component includes a top portion and a bottom portion. The seat assembly further includes a first trunnion joint and a second trunnion joint, wherein the first and second trunnion joints connect the bottom portion of the backrest component to the first side structure and the second side structure, respectively. The first trunnion joint and the second trunnion joint enable the backrest to pivot between at least a first angular position and a second angular position. The top portion of the backrest component is closer to the seat component when the backrest component is in the first angular position than in the second angular position. The seat assembly further includes a latch mechanism configured to lock the backrest in at least one of the first angular position and the second angular position.

In yet another embodiment, the wheelchair includes a base assembly having a central frame that has a forward portion and a rear portion. The base assembly also includes a leg assembly having a leg and a caster wheel subassembly. The leg includes an elongated body that defines a top end and a bottom end. The caster wheel subassembly is connected to the bottom end of the leg. The base assembly also includes a connecting means for connecting the top end of the leg to the forward portion of the central frame. The connecting means provides for the movement of the leg between at least a first position and a second positioned. The location of the caster assembly wheel subassembly is further away from the central frame when the leg is in the first position than when the leg is in the second position. The seat assembly includes a seat component disposed above and connected to the central frame. The seat component comprising a forward portion and a rear portion. The seat assembly further includes a first side structure and an opposing second side structure, with the first and second side structures being disposed near the rear portion of the seat component. The seat component further includes a height-adjustable armrest assembly provided on the first side structure.

Other examples of the disclosed [subject], and method of making the same, will become apparent from the following detailed description, the accompanying drawings, and the appended claims.

DETAILED DESCRIPTION

Figure 1:
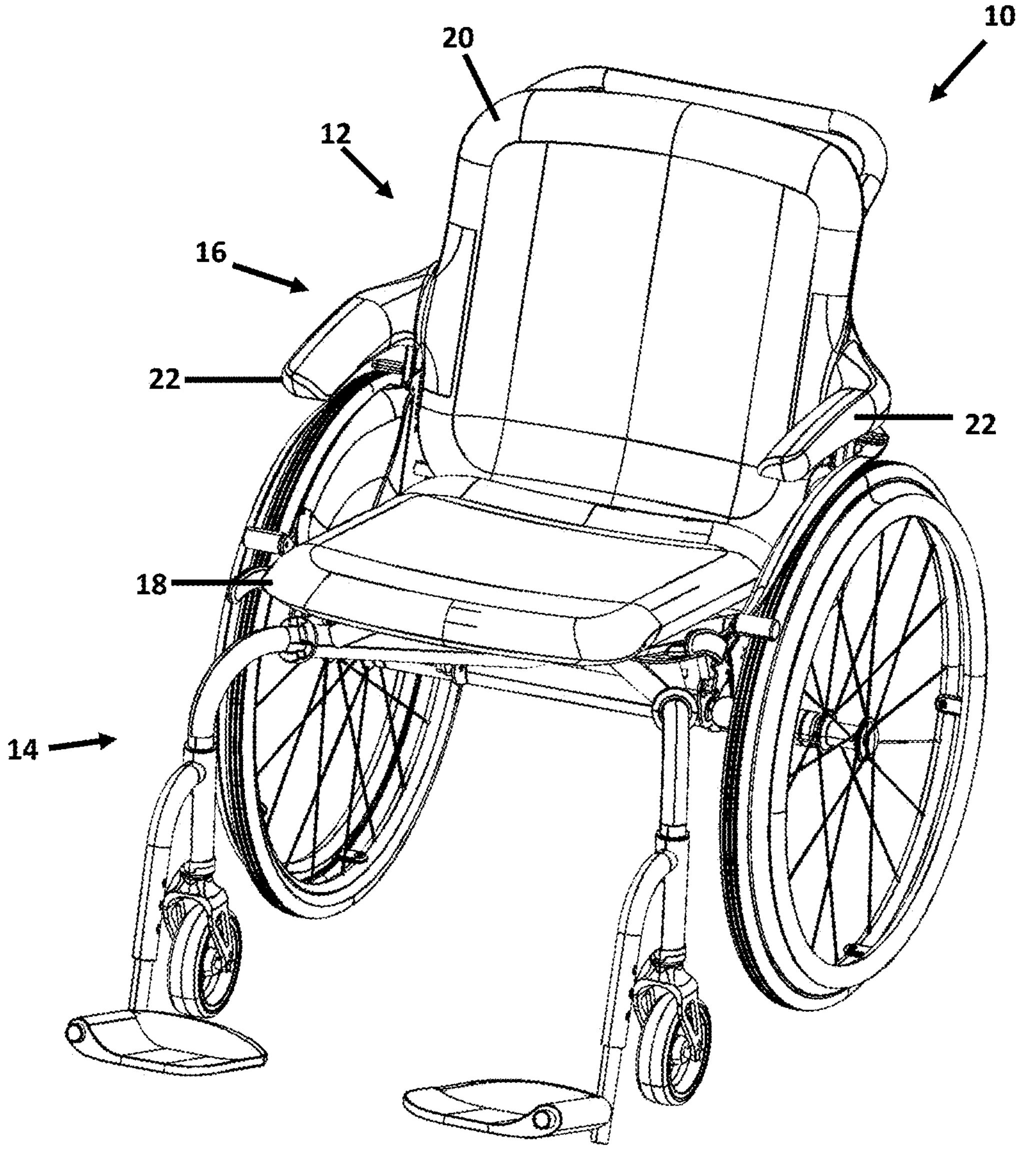
FIG. 1 is a front perspective view of the wheelchair of the present disclosure.
Figure 2:
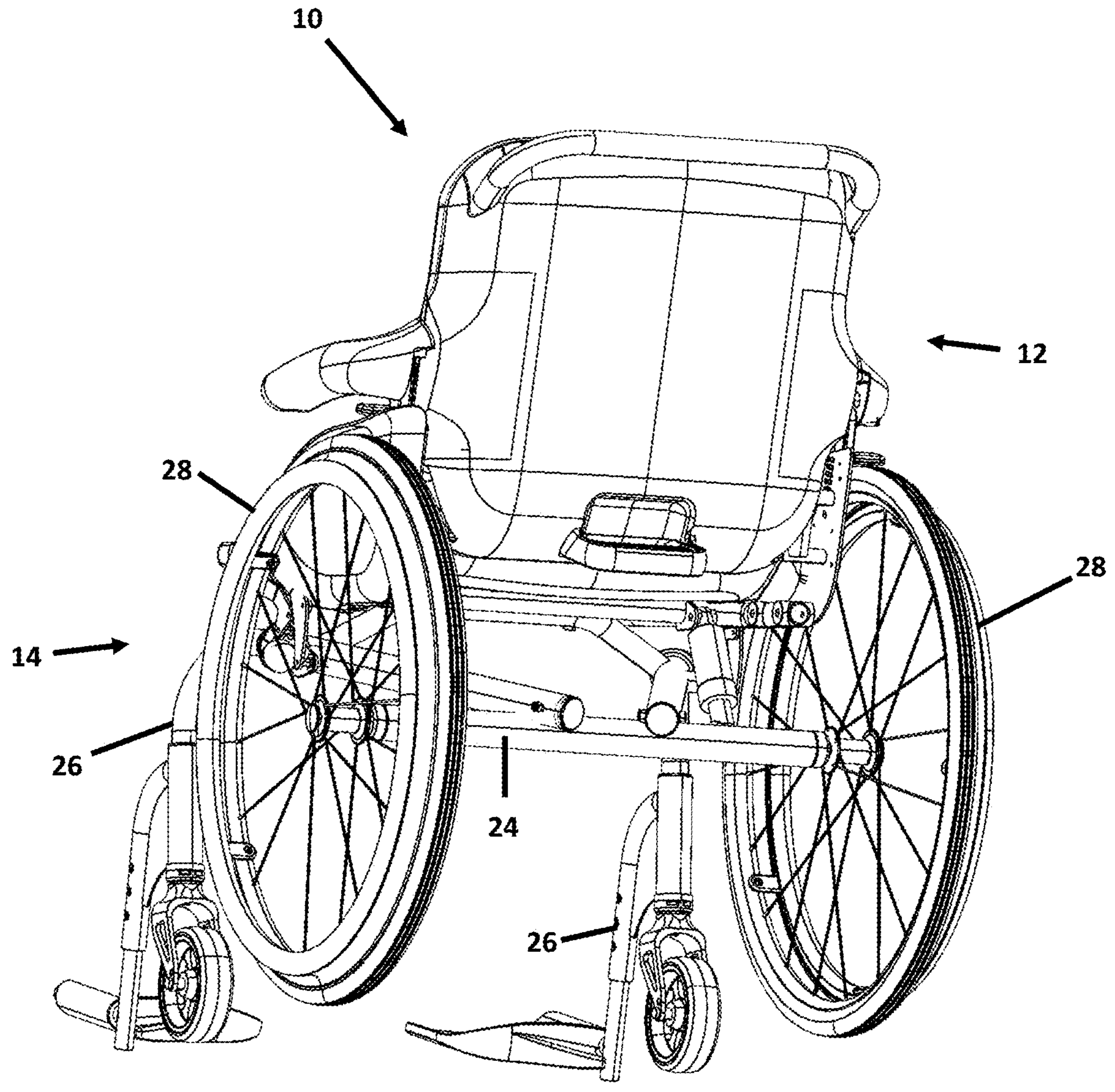
FIG. 2 is a rear perspective view of the wheelchair of FIG. 1.
Figure 3:
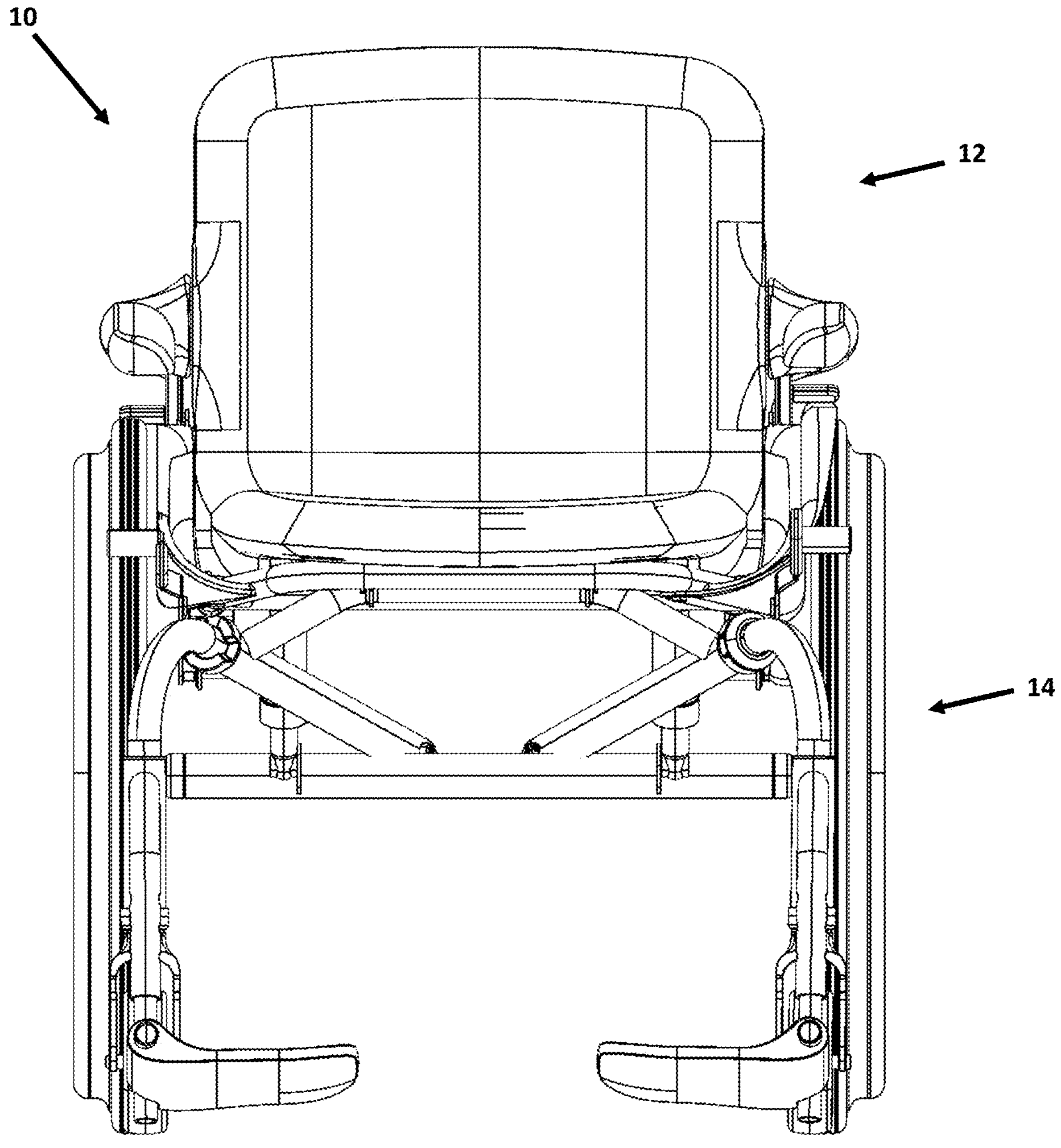
FIG. 3 is a front elevation view of the wheelchair of FIG. 1.
Figure 4:
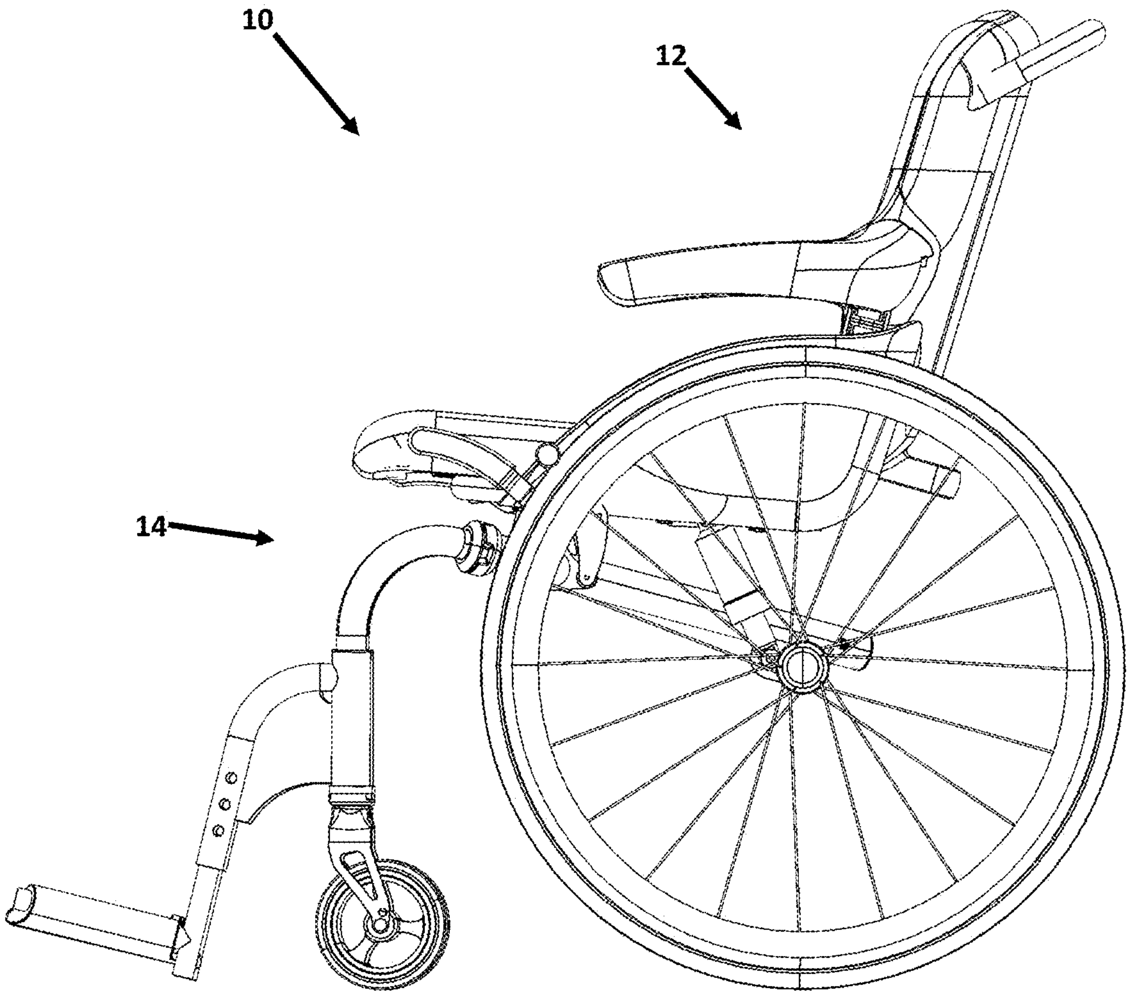
FIG. 4 is a right-side elevation view of the wheelchair of FIG. 1.
Figure 5:
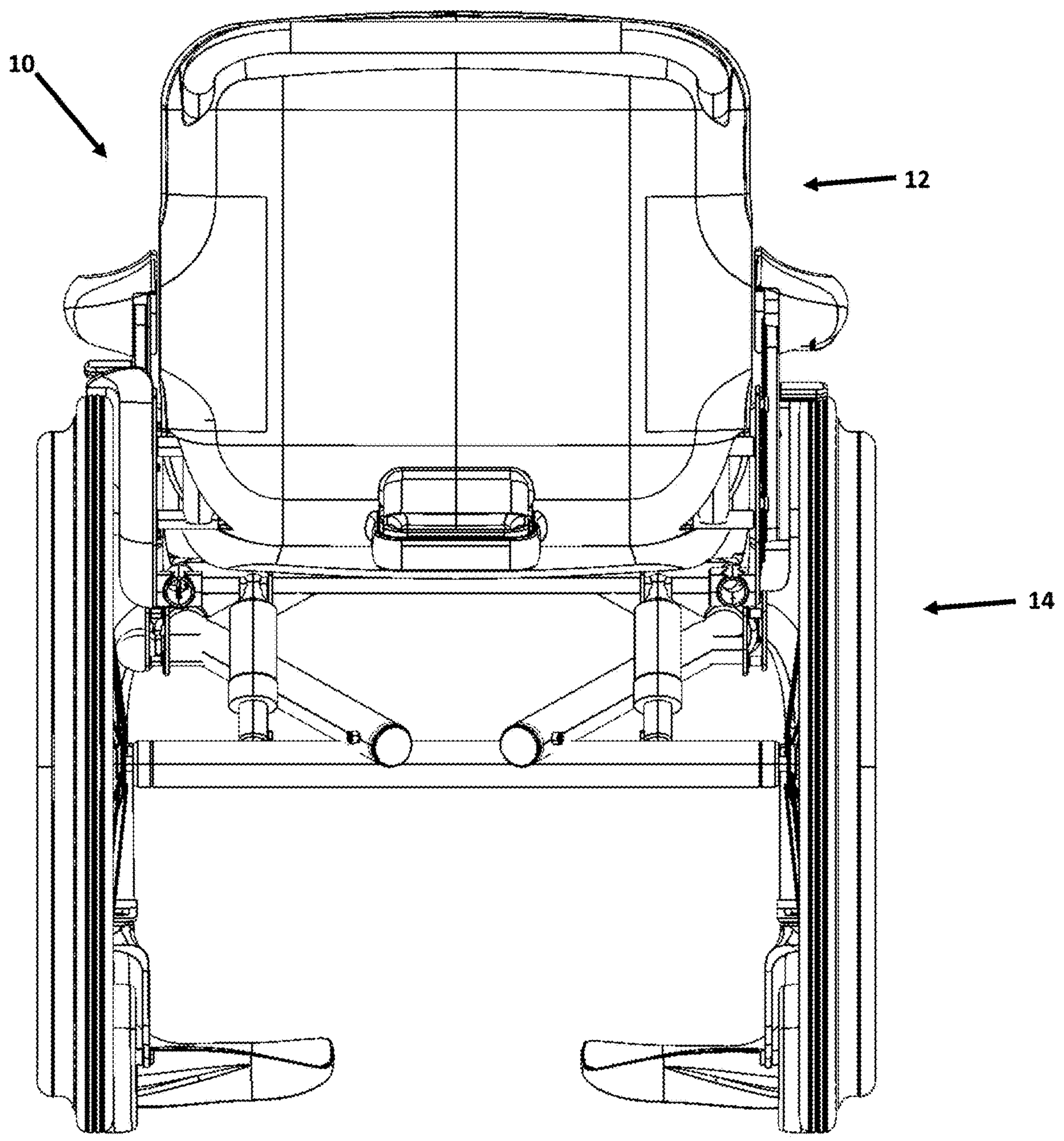
FIG. 5 is a rear elevation view of the wheelchair of FIG. 1.
Figure 6:
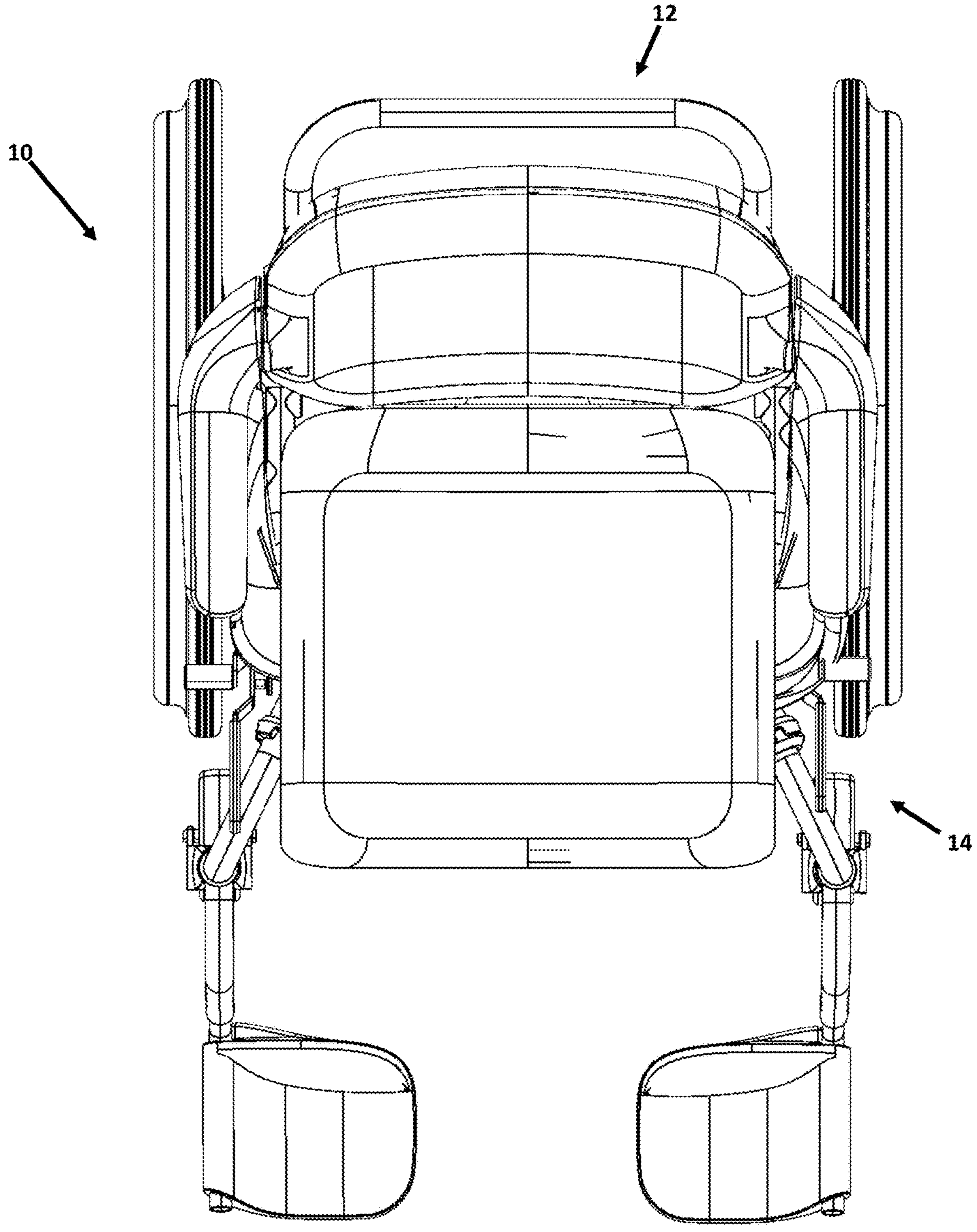
FIG. 6 is a top plan view of the wheelchair of FIG. 1.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

Referring to FIGS. 1-8, the present disclosure provides an exemplary embodiment of a wheelchair 10. The wheelchair 10 is an assistive device for assisting individuals in moving from one location to another, particularly individuals who have limited mobility. The wheelchair 10 incorporates various adjustable features (e.g., armrests and footrests) that allow the wheelchair 10 to accommodate individuals (i.e., users) of varying sizes and heights, as well as aesthetic and comfort features (e.g., cushioning, upholstery, paneling) that make the wheelchair 10 attractive and comfortable to sit on. Moreover, the wheelchair 10 is also collapsible, capable of reducing its vertical height, which enables it to be more easily stored and transported.

Figure 9:
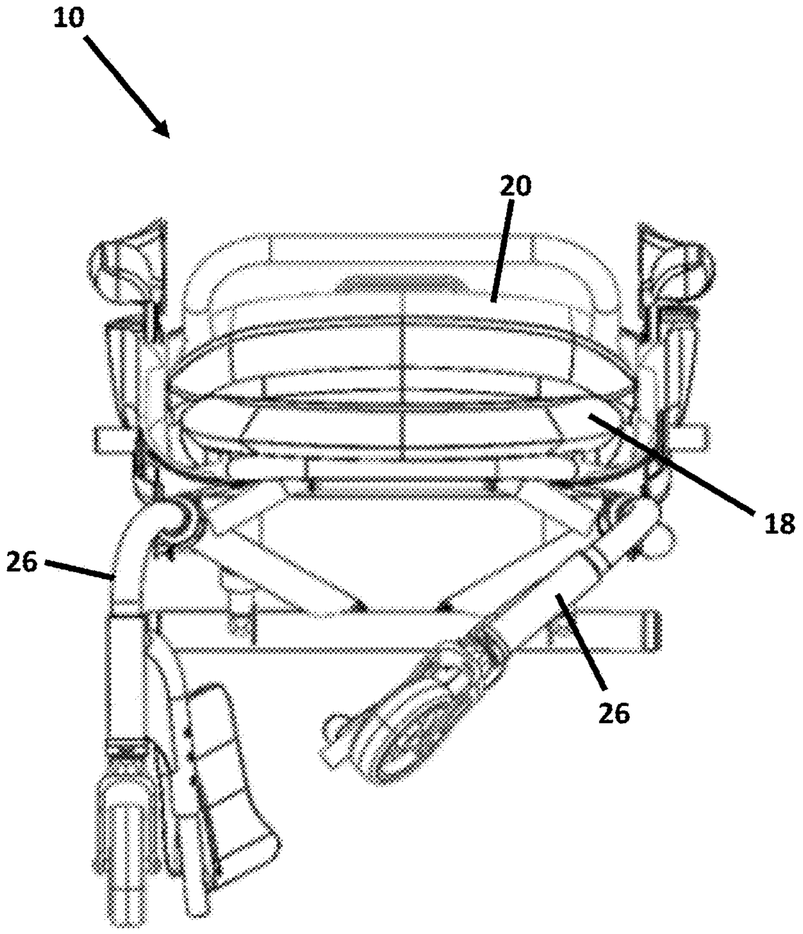
FIG. 9 is a front elevation view of the wheelchair of FIG. 1 with the backrest component folded downwards and a leg assembly turned inwards.
Figure 10:
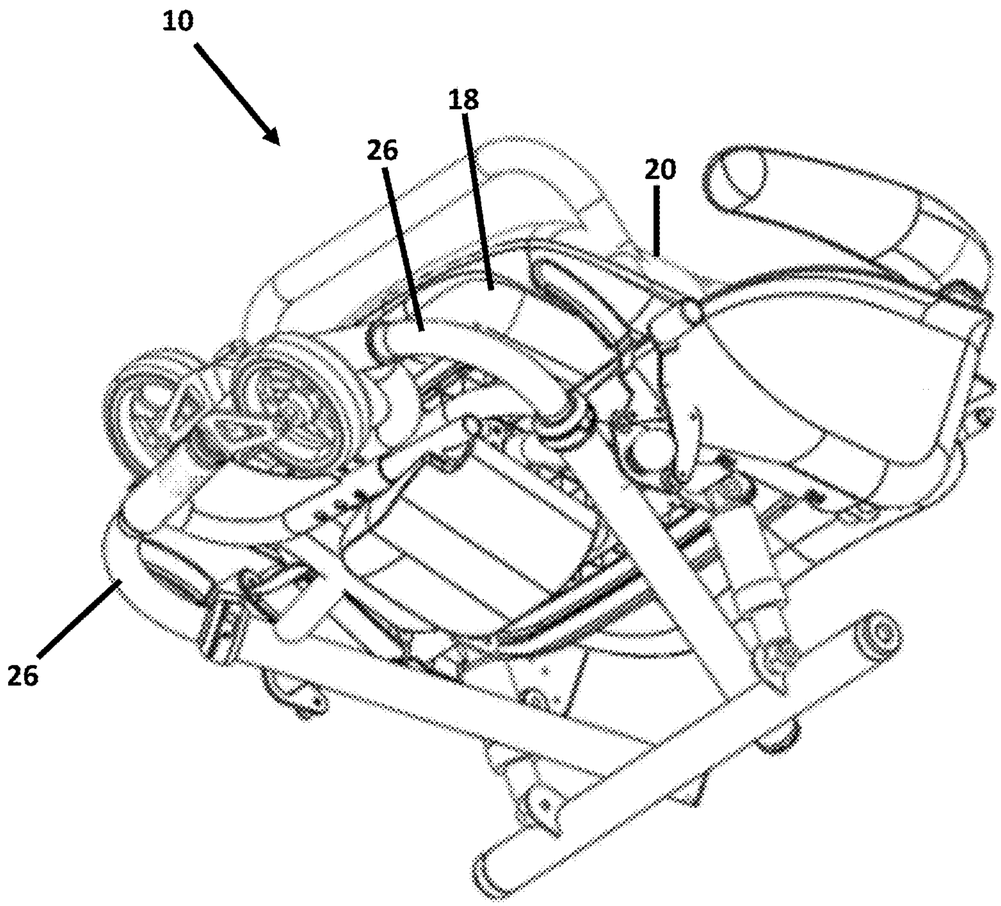
FIG. 10 is a bottom perspective view of the wheelchair of FIG. 1 fully collapsed.
Figure 11:
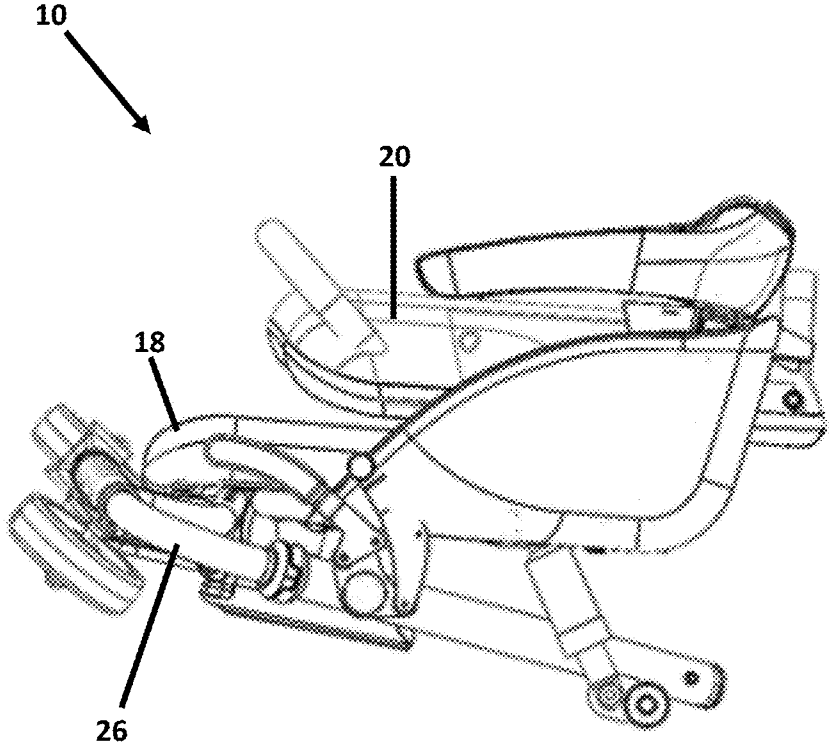
FIG. 11 is a side elevation view of the wheelchair of FIG. 1 fully collapsed.
Figure 12:
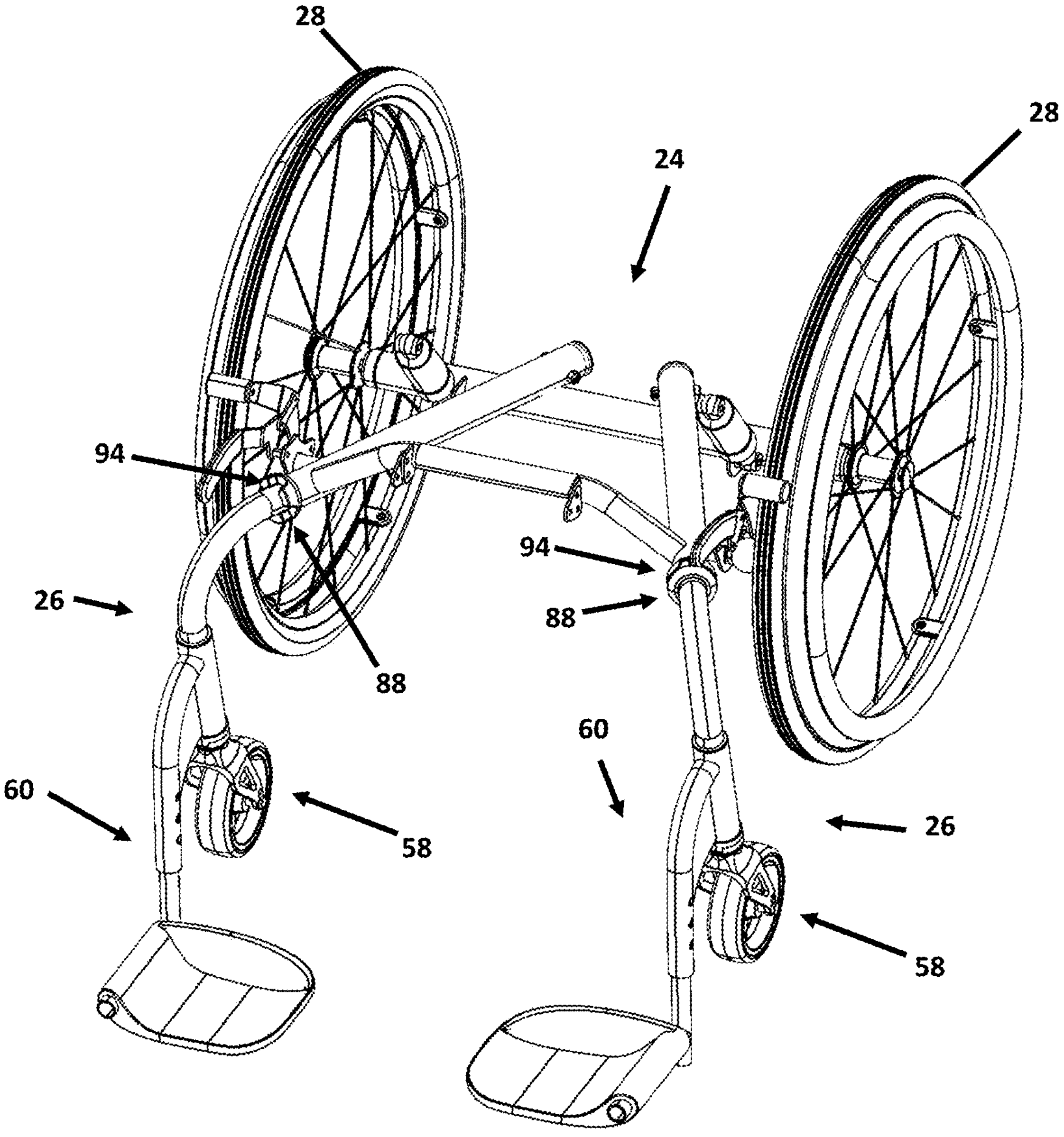
FIG. 12 is a top perspective view of the base assembly of the wheelchair of FIG. 1.

The wheelchair 10 includes a seat assembly 12 (best shown in FIGS. 17-18) and a base assembly 14 (best shown in FIG. 12). The seat assembly 12 provides a sitting surface 16 for an individual to sit in the wheelchair 10 and the base assembly 14 supports the seat assembly 12 from below. The seat assembly 12 generally includes a seat component 18, a backrest component 20, and opposing side structures 22. The base assembly 14 generally includes a central frame 24, front leg assemblies 26, and rear wheels 28. The collapsibility of the wheelchair 10 is attributable to various features, described in greater detail below, that enable backrest component 14 to fold down towards the seat component 12 and for front leg assemblies 26 to turn inwards towards the central frame 24 (FIGS. 9-11).

Figure 13:
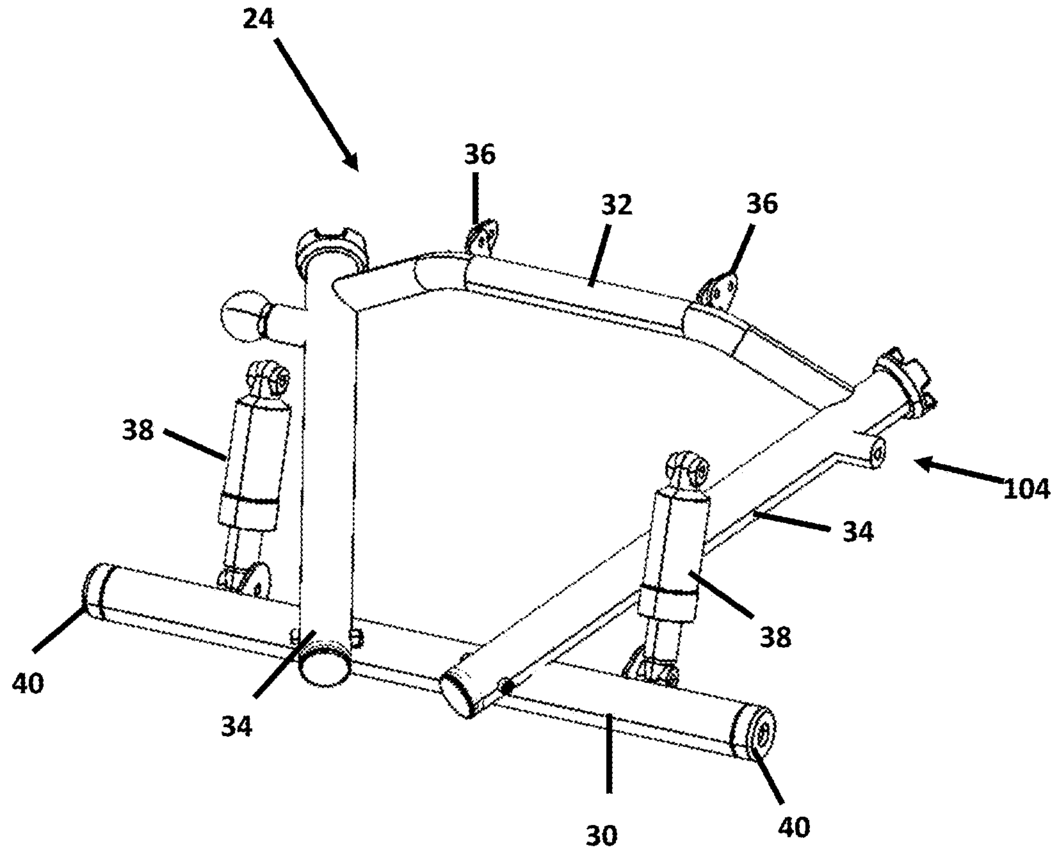
FIG. 13 is a rear perspective view of the central frame of the base assembly of FIG. 6 in isolation.

Referring to FIG. 13, an exemplary embodiment of a central frame 24 is shown. This central frame 24 includes a rear crossbar 30 and a front crossbar 32 connected by two longitudinal members 34. The two longitudinal members 34 are connected to the opposing ends of the front crossbar 32 but are oriented inwards towards the back such they meet the rear crossbar 30 near its center. By this design, the front leg assemblies 26, which are attached to the front ends of the longitudinal members 34, flare outwards towards the front (FIG. 12) which provides for greater leg space for an individual sitting in the wheelchair 10.

To support the seat assembly 12, the front crossbar 32 includes a raised center portion that directly contacts the bottom side of the seat component 18. This supports the front of the seat compartment 18 from below, and brackets

36 provide for secure attachment between the two. Towards the rear, the rear crossbar 30 is disposed lower than the front crossbar 32 and does not contact the seat component 18 directly (FIG. 11). Rather, the rear crossbar 30 supports the rear of the seat component 18 via suspension members 38 (e.g., "shocks"), which are provided to dampen vibrations and/or impact forces experienced by the wheelchair 10 thereby making the wheelchair 10 more comfortable to ride in. These linear suspension members 38 are connected to the rear crossbar 30 at one end while connected to the seat component 18 at the other end.

Figure 7:
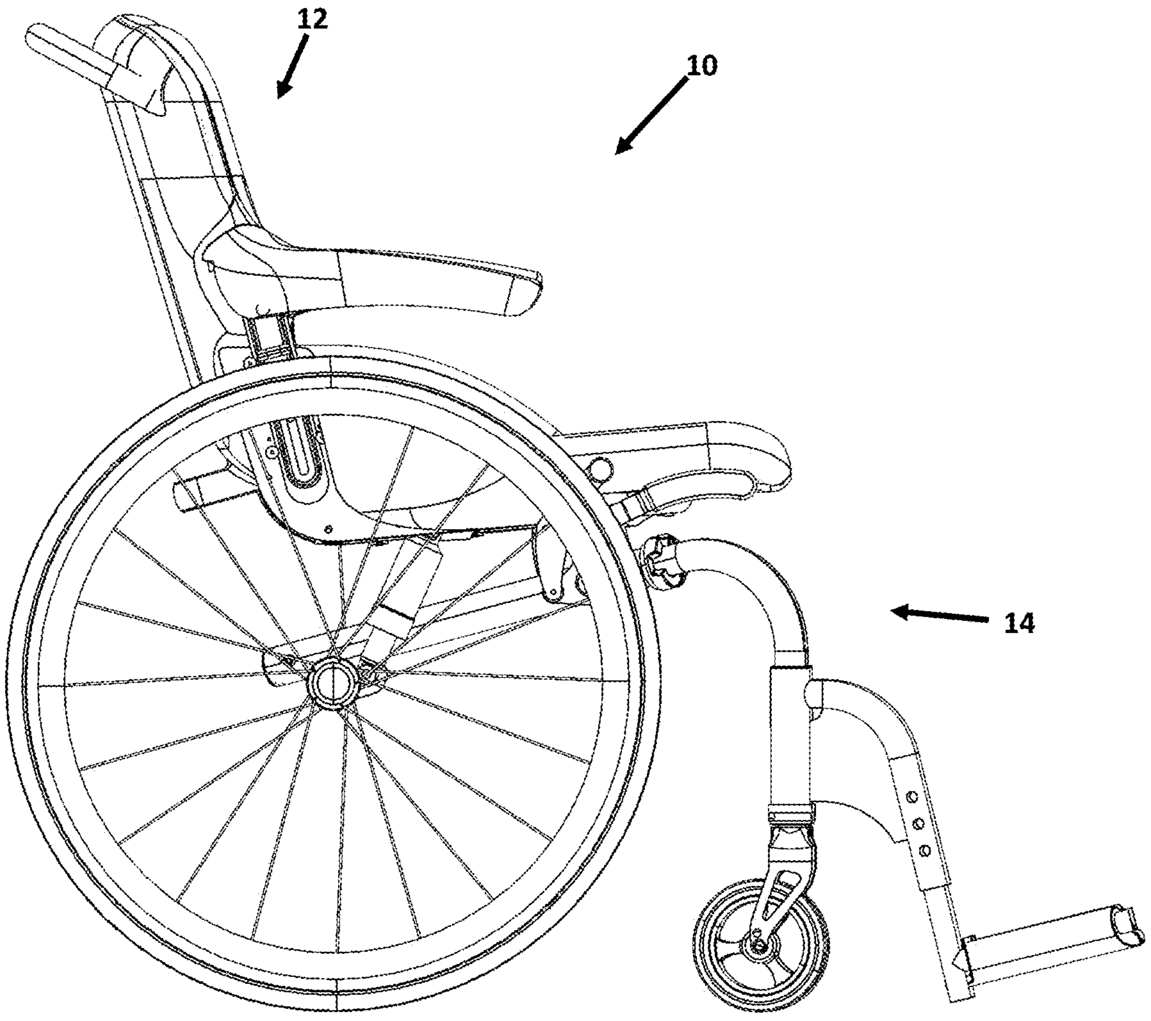
FIG. 7 is a left-side elevation view of the wheelchair of FIG. 1.
Figure 8:
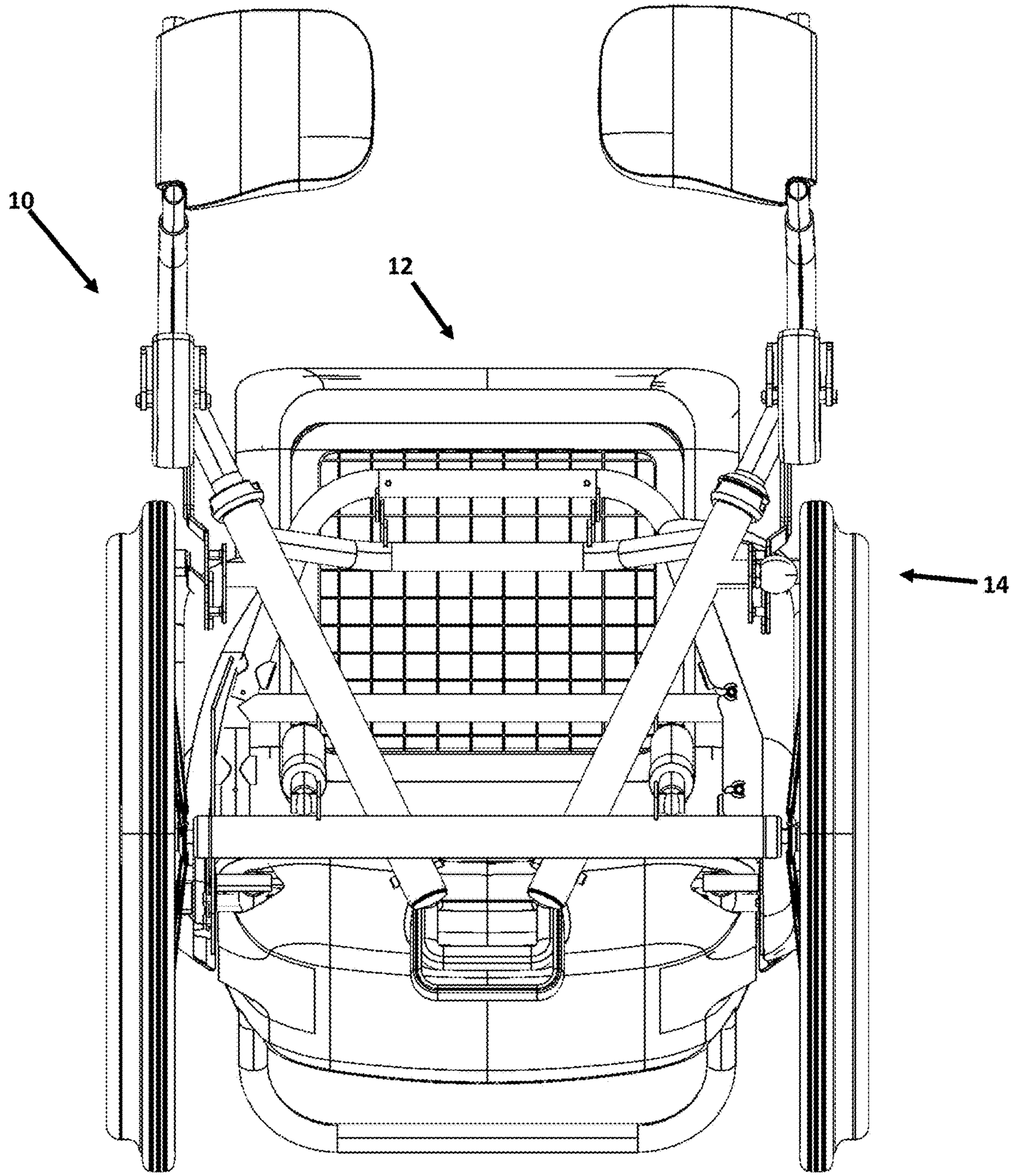
FIG. 8 is a bottom plan view of the wheelchair of FIG. 1.

Those skilled in the art will appreciate that while the central frame 24 of FIG. 7 is considered exemplary, it is not meant to be limiting. It is contemplated that central frames with different configurations of structural members may be utilized as well. For example, the longitudinal members may be oriented parallel to one another. In another example, suspension members may also be provided on the front cross bar. In yet another example, the rear crossbar may include a raised center portion like the front cross bar. Differences such as these will not result in a departure from the scope of the present disclosure.

Figure 14:
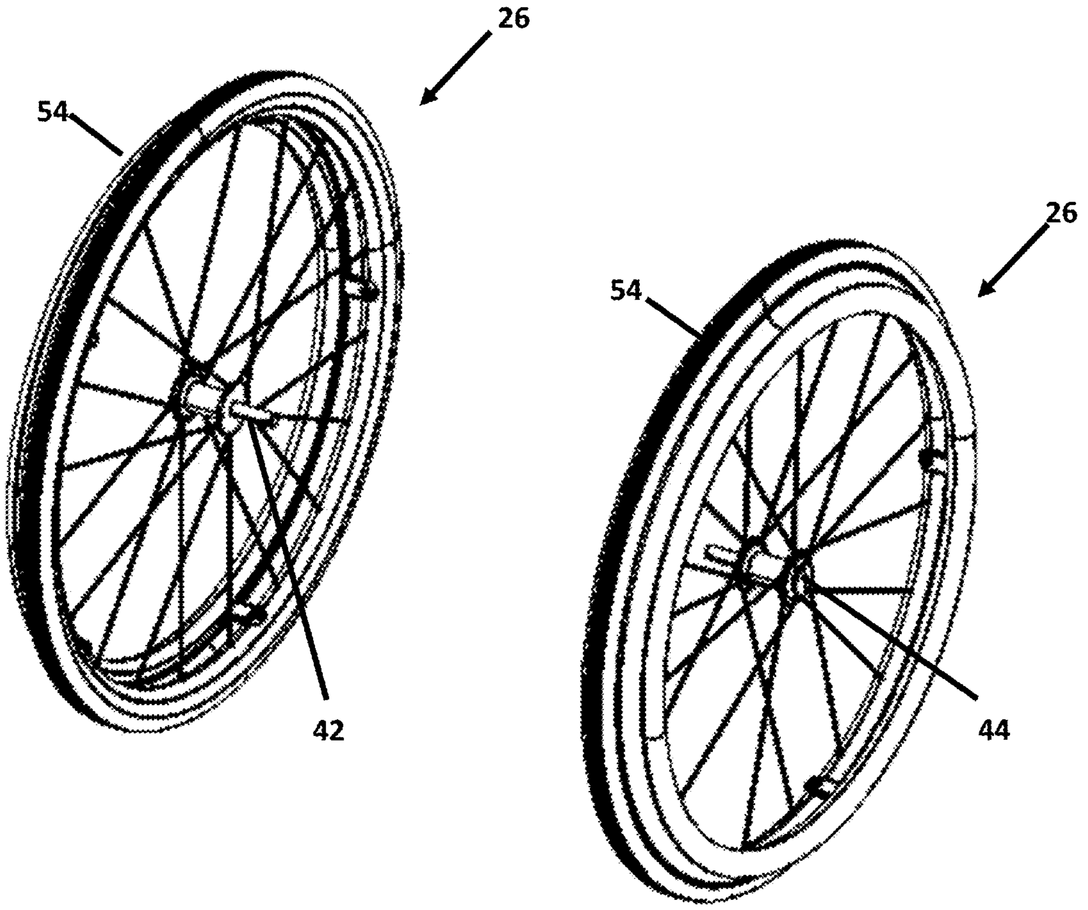
FIG. 14 is a front perspective view of the pair of rear wheels of the base assembly of FIG. 6 in isolation.

Referring to FIGS. 13 and 14, the central frame 24 includes rear wheel axle sockets 40 for receiving axle pins 42 as a way of connecting the hub 44 of a rear wheel 28 to the central frame 24. As in the embodiment shown, the rear wheel sockets 40 may be incorporated into the opposing ends of the rear crossbar 30. In one or more embodiments, the axle pins 42 may be integrated onto the hubs 44 of the rear wheels 28 directly. This socket-and-axle-pin connection enables the attachment and free rotational movement of the rear wheels 28. Ideally, the socket-and-axle-pin connection would also provide for easy detachment and reattachment of the rear wheels 28 (e.g., via a quick release mechanism).

Figure 34:
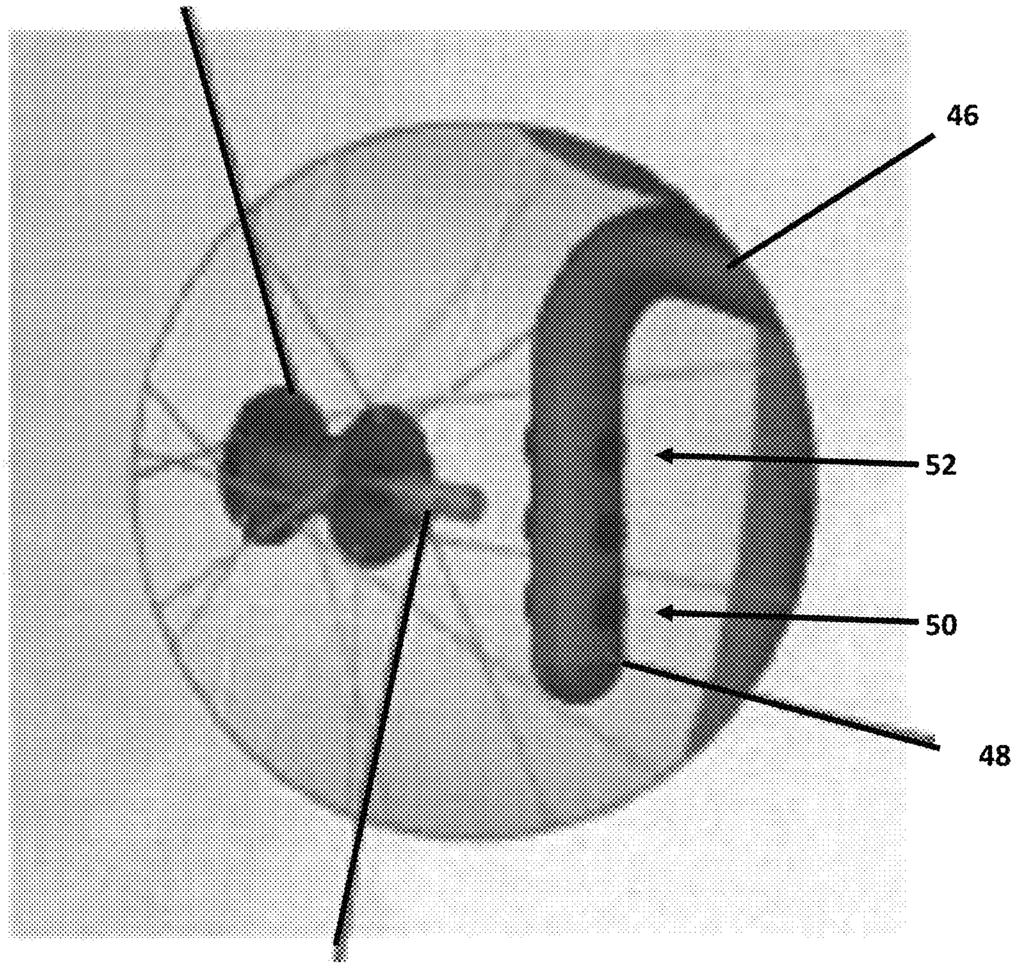
FIG. 34 is a close-up view of a portion of the wheelchair of FIG. 33.

Referring to FIG. 34, depicted is an alternative embodiment of the rear crossbar 46 that further includes side portions 48 that extend downwards from the horizontal dimension of the rear crossbar 46 (one side being shown). Provided on these side portions 48 are a plurality of vertically aligned rear wheel sockets (three being shown) that allow the rear wheels 28 to be attached at various vertical positions. In effect, this enables the vertical height of the seat assembly 12 to be adjusted as desired. For example, attaching a rear wheel 28 to the lowest socket 50 enables an individual to ride relatively high above the ground, whereas attaching a rear wheel 28 to the uppermost socket 52 enables an individual to ride relatively low to the ground.

As shown, each of the rear wheels 28 may comprise a push rim 54 (or "hand rim") located around an outer circumference of each rear wheel 28. The push rim 54 may provide a user with a surface to grab and induce rotation of the rear wheels 28 while the user is sitting in the wheelchair 10.

Figure 15:
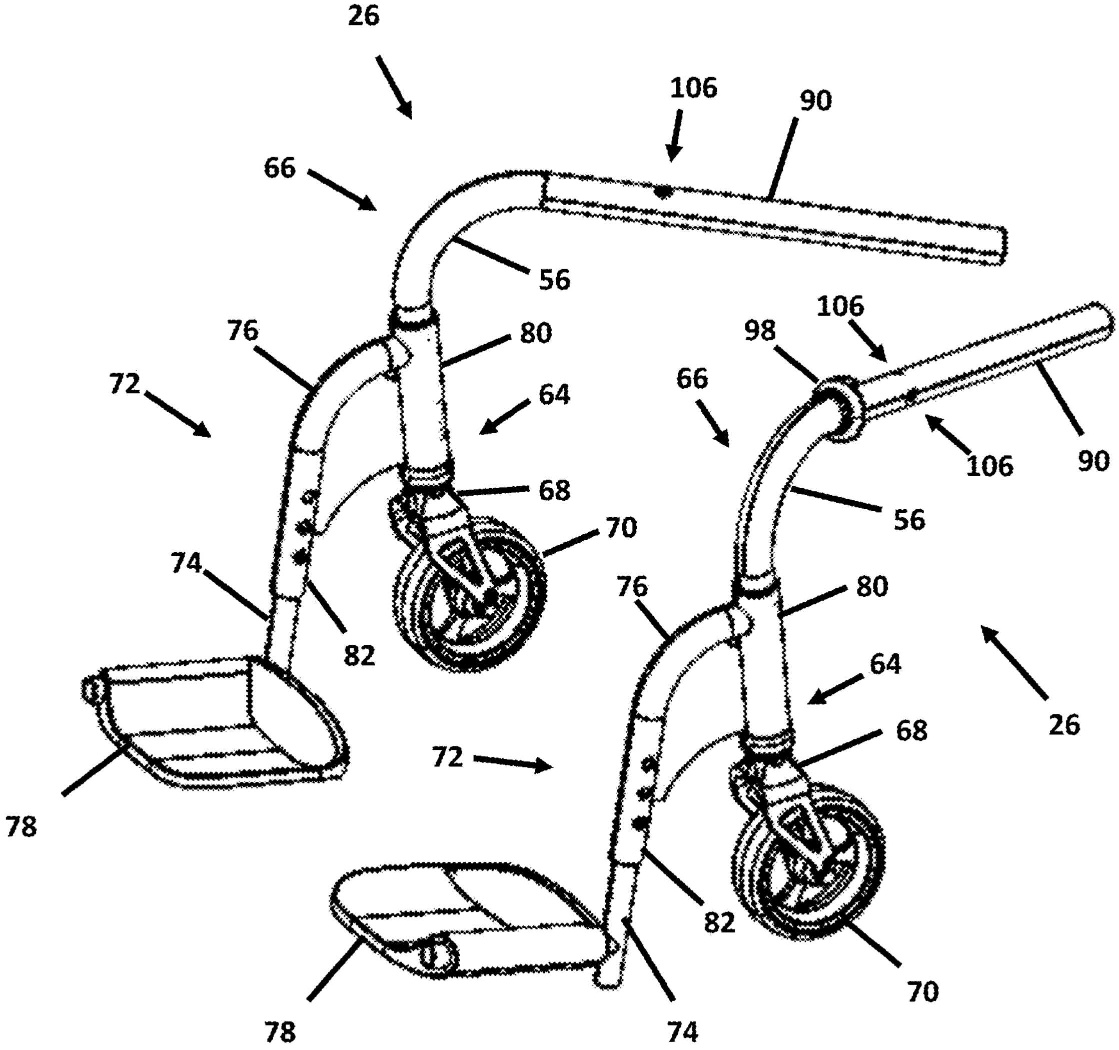
FIG. 15 is a side perspective view of a pair of leg assemblies of the base assembly of FIG. 6 in isolation.

Towards the front of the central frame 24, the base assembly 14 includes two leg assemblies 26 (FIG. 15). The leg assemblies 26 each include a leg 56, a caster wheel subassembly 58, and a footrest subassembly 60. As used herein, the term "caster wheel subassembly" refers to a caster wheel and a bracket for retaining the caster wheel and attaching it to a leg. As used herein, the term "footrest subassembly" refers to a footrest and a front rigging for retaining the footrest and attaching it to a leg. Ideally, the front rigging of a footrest subassembly would provide for vertical adjustment of a footrest to accommodate individuals of varying heights.

A leg 56 of a front leg assembly 26 may include an elongated body that defines a bottom end 64 and a top end 66. The bottom end 64 may be attached to a caster wheel subassembly 58, such as the clevis-type bracket 68 and caster wheel 70 that is shown. A footrest subassembly 60 may include a front rigging 72 having a bottom piece 74 and a top piece 76. The bottom piece 74 may be connected to, and thereby support, the footrest 78 (e.g., by a forward prong that is inserted into the footrest). Ideally, the connection between the footrest 78 and the bottom piece 74 would enable the footrest 78 to pivot around the bottom piece 74 so that an individual can turn it downwards to be used (FIG. 15) and upwards to put it away (FIG. 9). The top piece 76 includes a collar portion 80 that is coaxially received over the leg 62. Ideally, the collar portion 80 may enable the footrest subassembly 60 to pivot around the leg 62 so that the entire footrest subassembly 60 can be turned inwards to be stowed (FIG. 9) and outwards to be used (FIG. 15). The bottom piece 74 front rigging 72 may be inserted into the top piece 76 and secured in place by height adjustment mechanism 82. Height adjustment mechanism 82 may include a push-button 84 provided on the bottom piece 74 and a series of holes 86 defined in the top piece 76, or vice versa. The push-button 84 may be biased (e.g., by an internal spring) outwards so that it enters one of the holes 86 to thereby restrict telescopic movement.

The base assembly 14 includes at least one connecting means for connecting the central frame 24 to the top end of a leg 62. Ideally, a connecting means would provide for the free movement of a leg assembly 26 between at least a first position and a second position, wherein the caster wheel subassembly 58 is located further away from the central frame 24 when the leg assembly 26 is in the first position than when it is in the second position.

Figure 16:
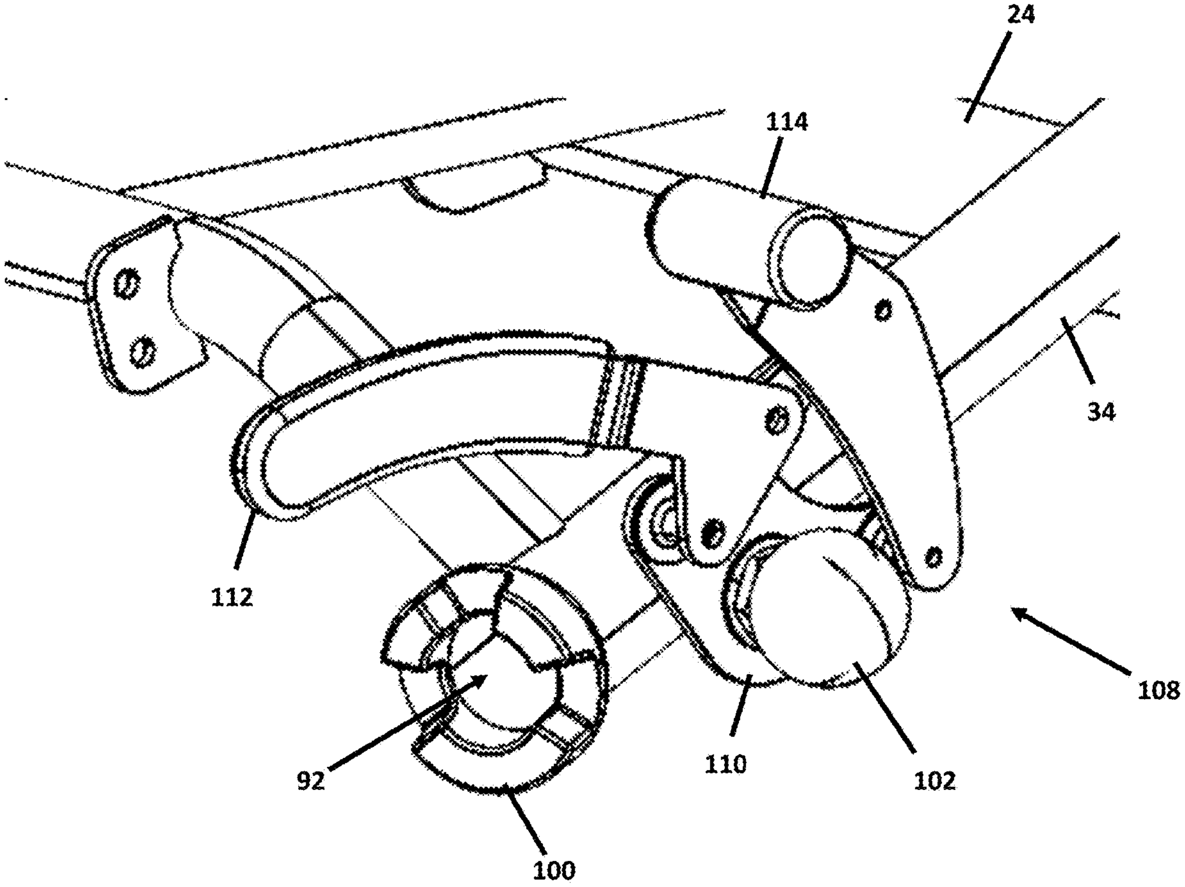
FIG. 16 is a side perspective view of the brake assembly of the base assembly of FIG. 6.

Referring to FIGS. 12, 15, and 16, an exemplary embodiment of a connecting means 88 is shown. This connecting means 88 includes shaft 90, which is connected to the top end 66 of a leg 62, and a receiving channel 92, which is defined in the central frame 24 (in this case, defined in longitudinal member 34). By inserting the shaft 90 into the receiving channel 92, the leg assembly 26 can be connected to the central frame 24. Further, this connecting means 88 may also include hirth joint 94 and latch mechanism 96. The hirth joint 94 includes a first hirth coupling 98 and a corresponding second hirth coupling 100. The first hirth coupling 98 may be coaxially received over the shaft 90 and a second hirth coupling 100 may be connected to the central frame 24. The hirth joint 94 can thereby lock the shaft 90 at a particular angular orientation (and thus, the overall leg assembly 26) relative to the receiving channel 92 when the first and second hirth couplings 98, 100 are coupled together. The latch mechanism 96 includes a plunger pin 102, a through-hole 104 defined in the central frame 24 (FIG. 13) that extends into the receiving channel 92, and a receiving hole 106 defined in the shaft 90 (FIG. 15). By inserting the plunger pin 102 through the through-hole 104 and into the receiving hole 106, the latch mechanism 96 can thereby prevent telescopic movement of the shaft 90 relative to the receiving channel 92. Ideally, the shaft 90 may also define multiple receiving holes 106 at different angular positions about the shaft 90 so that the latch mechanism 96 can further lock the shaft 90 at different angular positions. Moreover, the latch mechanism 96 may also include a spring that biases the plunger pin 102 towards a receiving hole 106 and/or through it. It is contemplated that such a spring may be incorporated, for example, within the plunger pin 102 itself (e.g., within the bulb-shaped handle), or alternatively within the receiving cavity or within the shaft.

In operation, a plunger pin 102 may be pulled to retract the plunger pin 102 from at least one of the receiving hole 106 and the through-hole 104. Doing so frees the shaft 90 and enables telescopic movement between the shaft 90 and the receiving channel 92. From there, the shaft 90 can be pulled in the forward direction to decouple the hirth couplings 98, 100 of the hirth joint 94. This enables free rotation of the shaft 90 (and by extension, the entire leg assembly 26) about the receiving channel 92. The leg assembly 26 can then be rotated into a desired orientation (e.g., FIGS. 1, 9, and 10). Once in a desired orientation, the shaft 90 can be pushed back into the receiving channel 92 until the hirth couplings 98, 100 are coupled once again and the plunger pin 102 is reinserted into a receiving hole 106, thereby locking the leg assembly 26 into the desired orientation.

FIG. 16 shows an exemplary embodiment of a brake assembly 108 which may be present on either side of the wheelchair 10. The brake assembly 108 is comprised in part of a spacer 110, brake bar 112, and the lever 114. The spacer 110 allows the brake bar 112 and the lever 114 to be spaced from the central frame 24. The brake bar 112 is designed to make contact with the rear wheel 28 and induce sufficient friction to cause the rear wheel 28 to slow or cease rotation. Full engagement of the brake assembly 108 may also prevent a stationary wheelchair 10 from moving. This may be a particularly important safety measure if the wheelchair 10 is on a sloped surface. As shown, the spacer 110 may be incorporated into the latch mechanism 96 of the connecting means 88 described above, with the plunger pin 102 extending through spacer 110.

Figure 28:
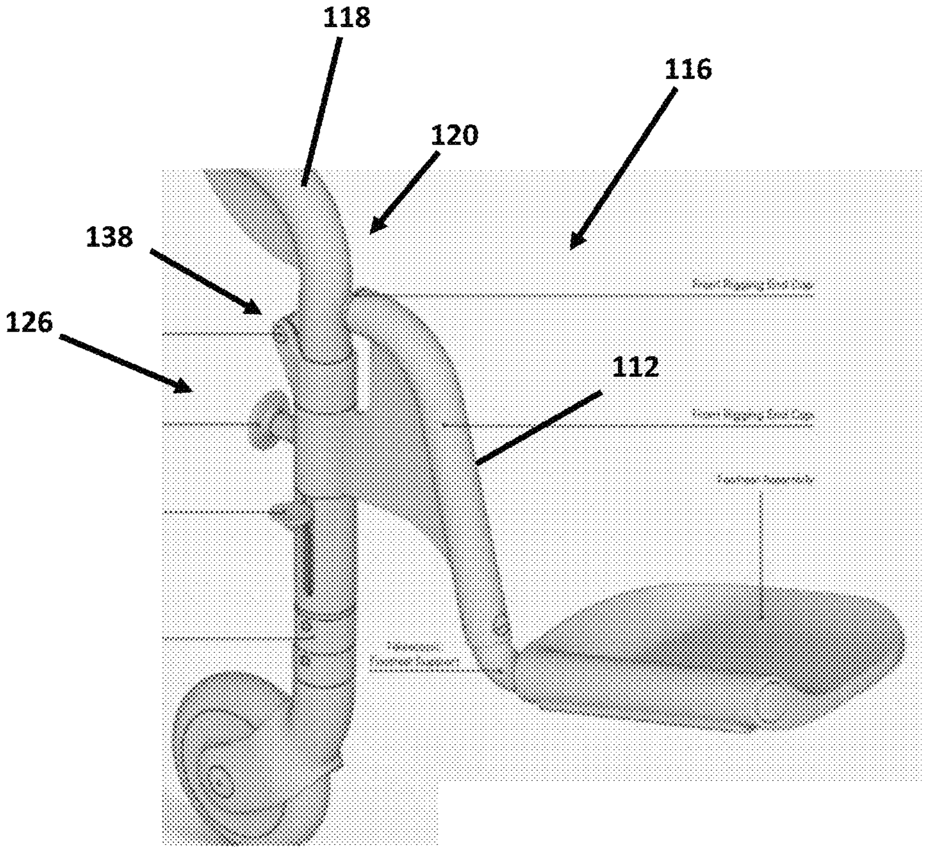
FIG. 28 is a front perspective view of an alternative embodiment of a front leg assembly.
Figure 29:
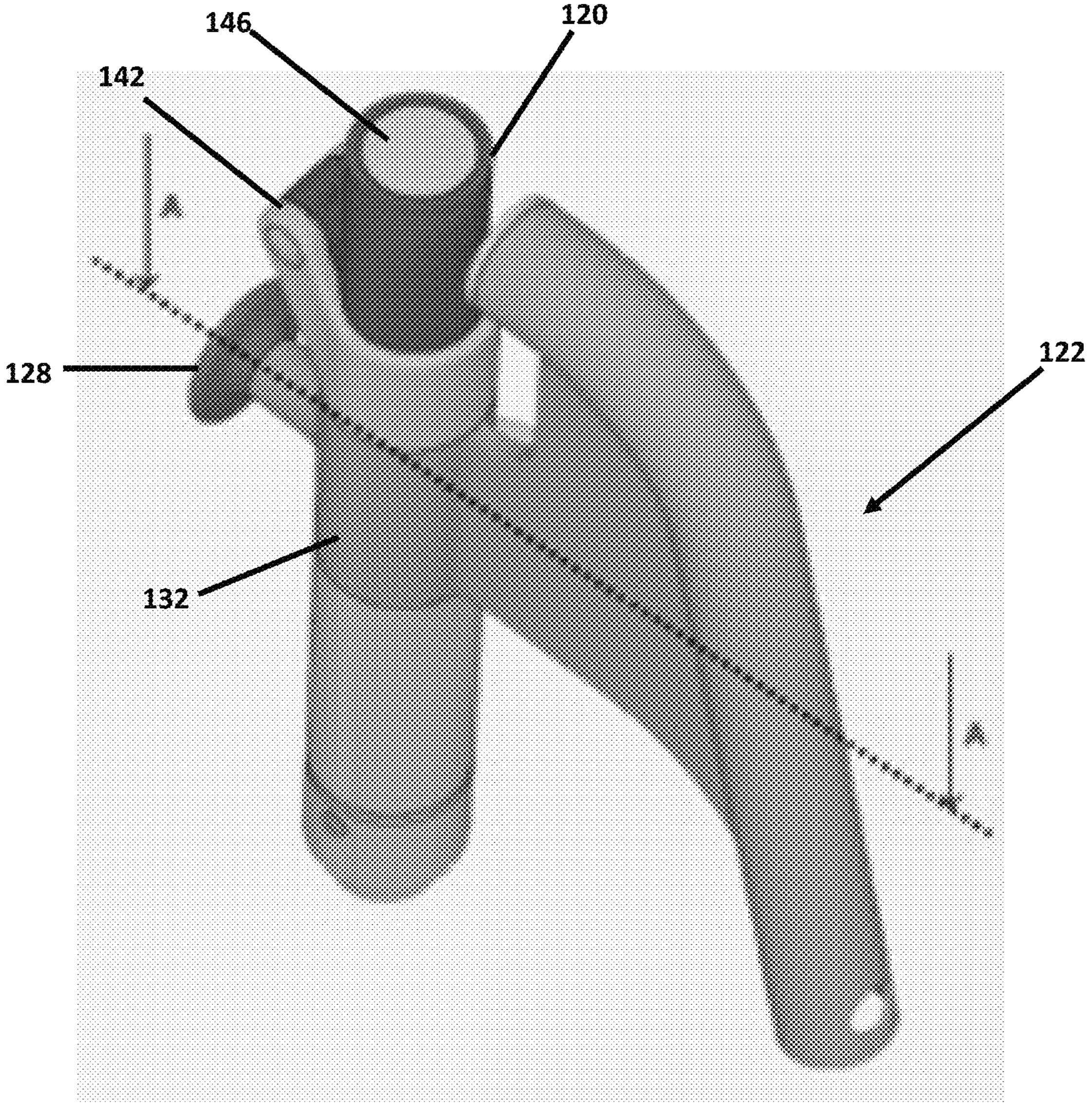
FIG. 29 is a top perspective view of a portion of the front leg assembly of FIG. 28.
Figure 30:
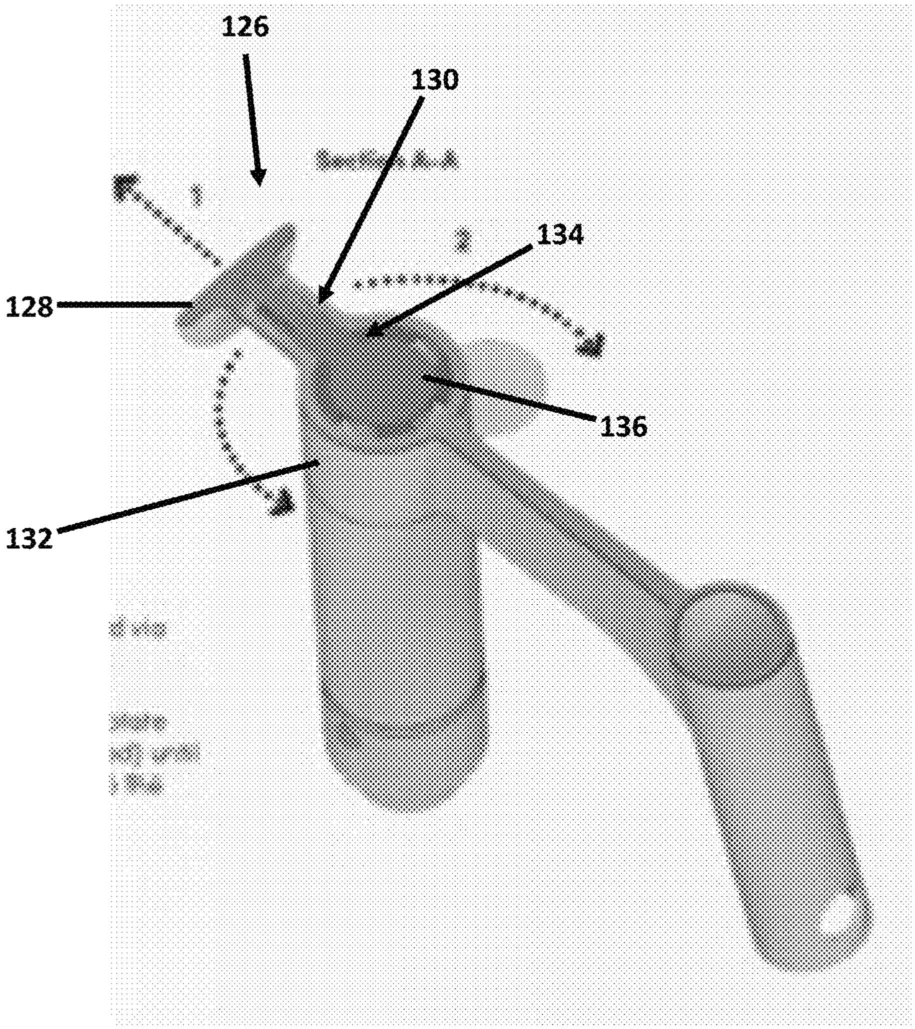
FIG. 30 is a cross-sectional view of a portion of the front leg assembly of FIG. 29.
Figure 31:
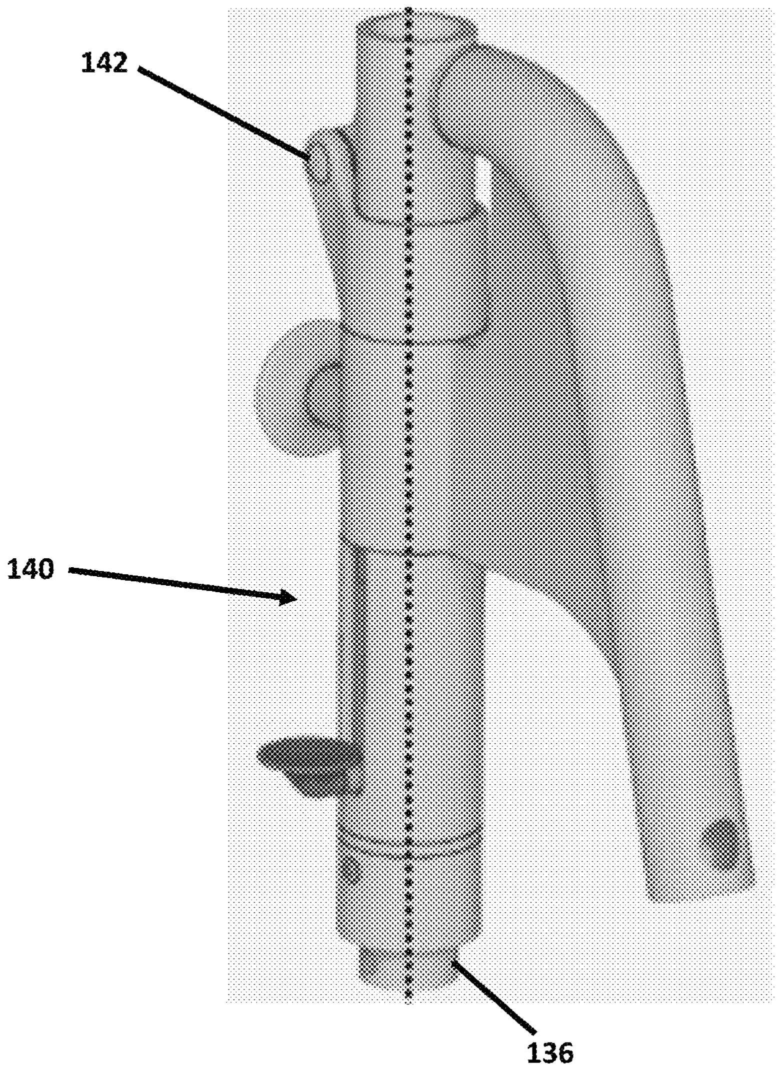
FIG. 31 is a side elevation view of a portion of the front leg assembly of FIG. 28.
Figure 32:
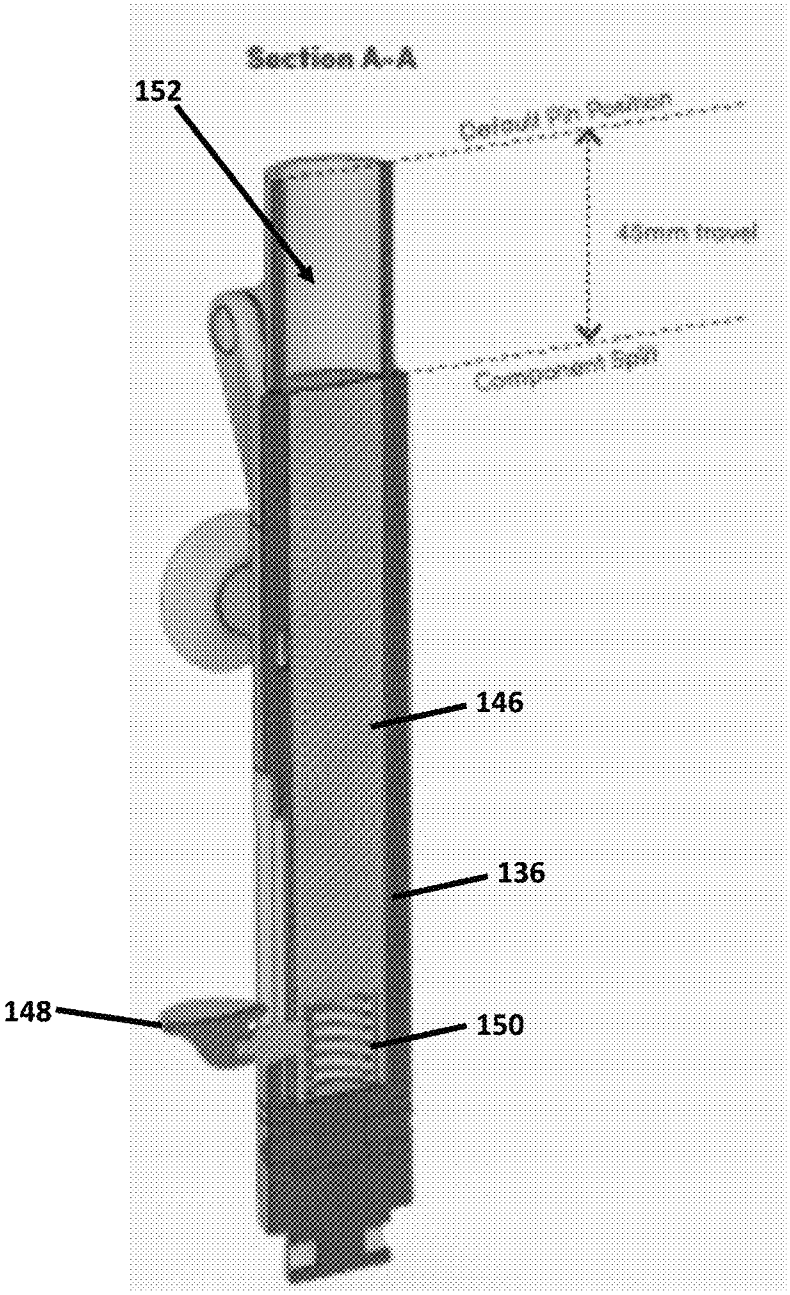
FIG. 32 is a cross-sectional view of a portion of the front leg assembly of FIG. 31.
Figure 33:
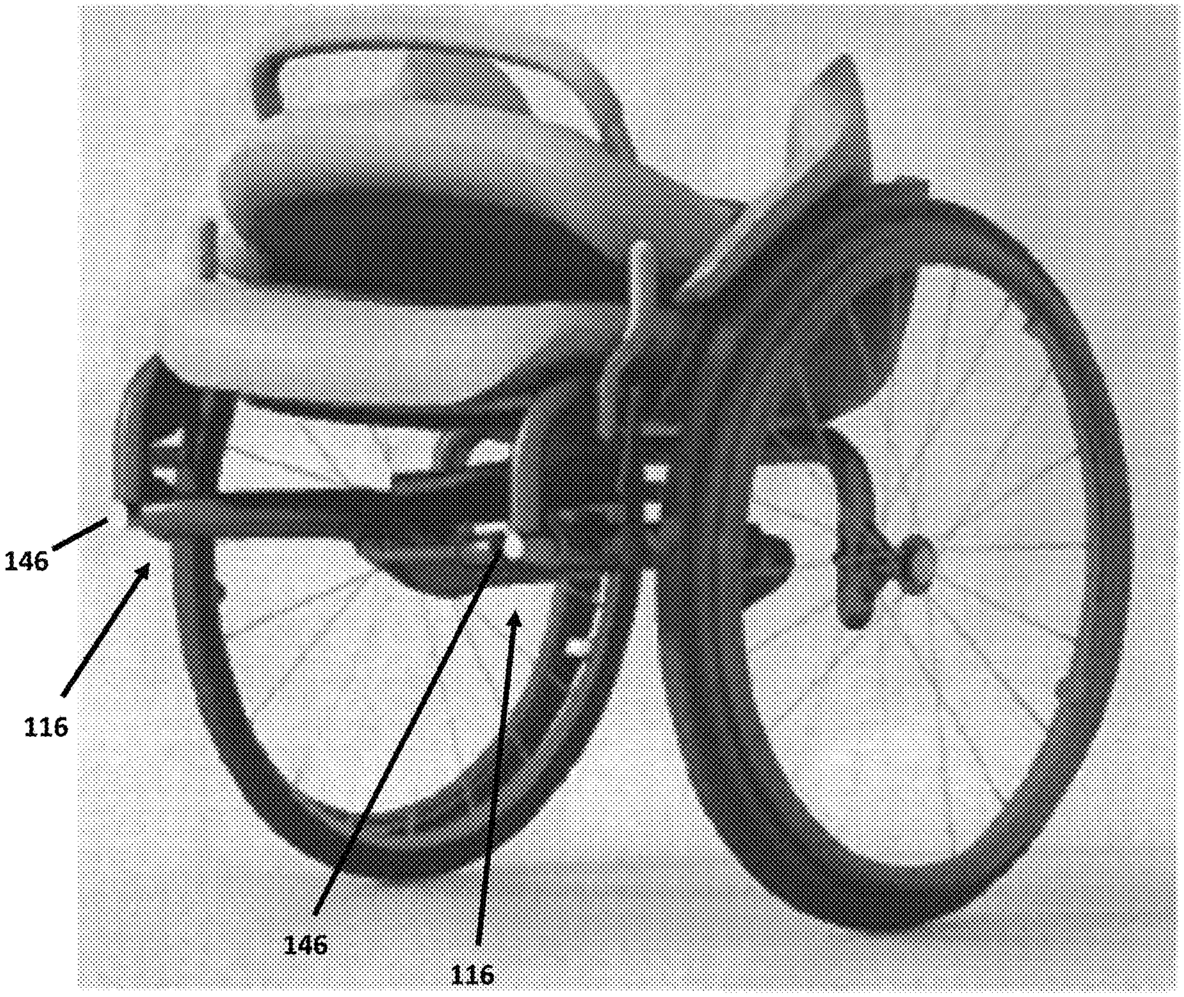
FIG. 33 is a front perspective view of an alternative embodiment of the wheelchair.

Referring to FIG. 28, depicted is an alternative exemplary embodiment of a front leg assembly 116. This front leg assembly 116 is connected to a central frame 118 that includes a forward end 120 that curves downward. Here, the top piece 122 of the front rigging 124 includes a latch mechanism 126 featuring a plunger pin 128 extending through a through-hole 130 in the collar portion 132 and is received within a receiving hole 134 defined in the leg 136 (FIGS. 29 and 30). This plunger pin 128 locks the position of the front rigging 124 to prevent it from pivoting around the leg 136, and may be retracted from the receiving hole 134 to release it.

Figure 22:
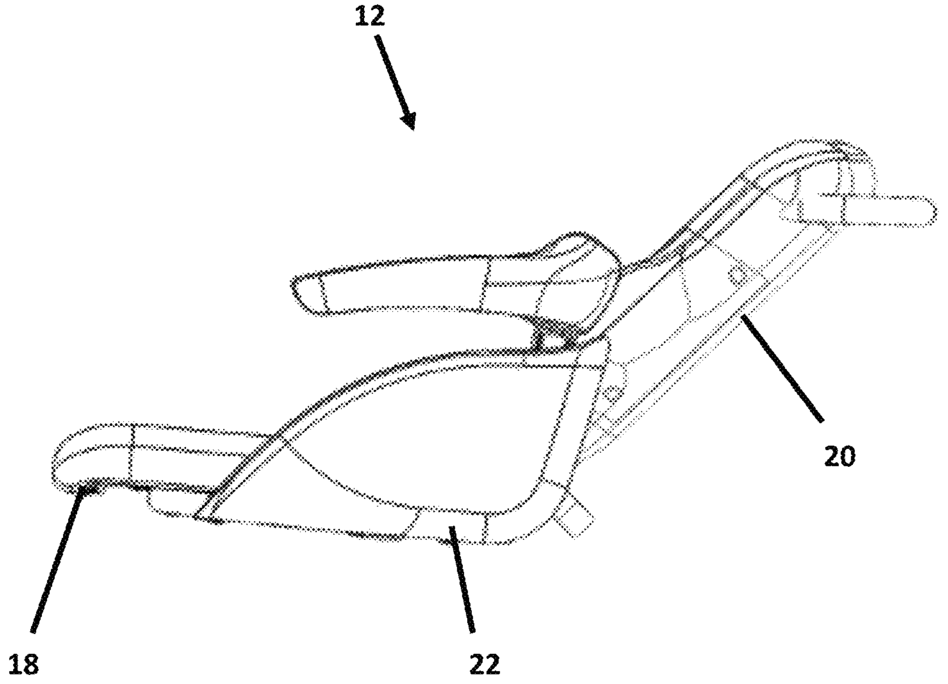
FIG. 22 is a side elevation view of the seat assembly of FIG. 17 with the backrest in a second reclined position.

Referring to FIGS. 28, 31, 32, and 33, depicted is a second exemplary embodiment of a connecting means 138. Here, the connecting means 138 includes sliding bolt lock 140 and hinge 142. The hinge 142 connects the forward end 120 of the central frame 118 to the top end 144 of the leg 136, and enables the leg 136 to pivot backwards under the central frame 118 when the sliding bolt lock 140 is not engaged (that is to say, move between at least a first position (FIG. 22) and a second position (FIG. 27)). The sliding bolt lock 140 is incorporated into the top end 144 of the leg 136 and includes bolt 146, handle 148, and spring 150. When the leg 136 is in the first position, the spring 150 may bias the bolt 146 upwards such that a portion of the bolt 146 enters a receiving channel 152 defined in the forward end 120 of the central frame 118 to lock the leg 136 in place. To release the leg 136, the handle 148 (which is connected to the bolt 146 and extends through a slot 150 defined in the leg 136) may be engaged to compress the spring 150 and retract the bolt 146 from the forward end of the central frame 118.

The connecting means of FIGS. 12, 15, and 16, and of FIGS. 28, 31, 32, and 33 notwithstanding, it is contemplated that various other connecting means may be employed without departing from the scope of the present disclosure.

Figure 17:
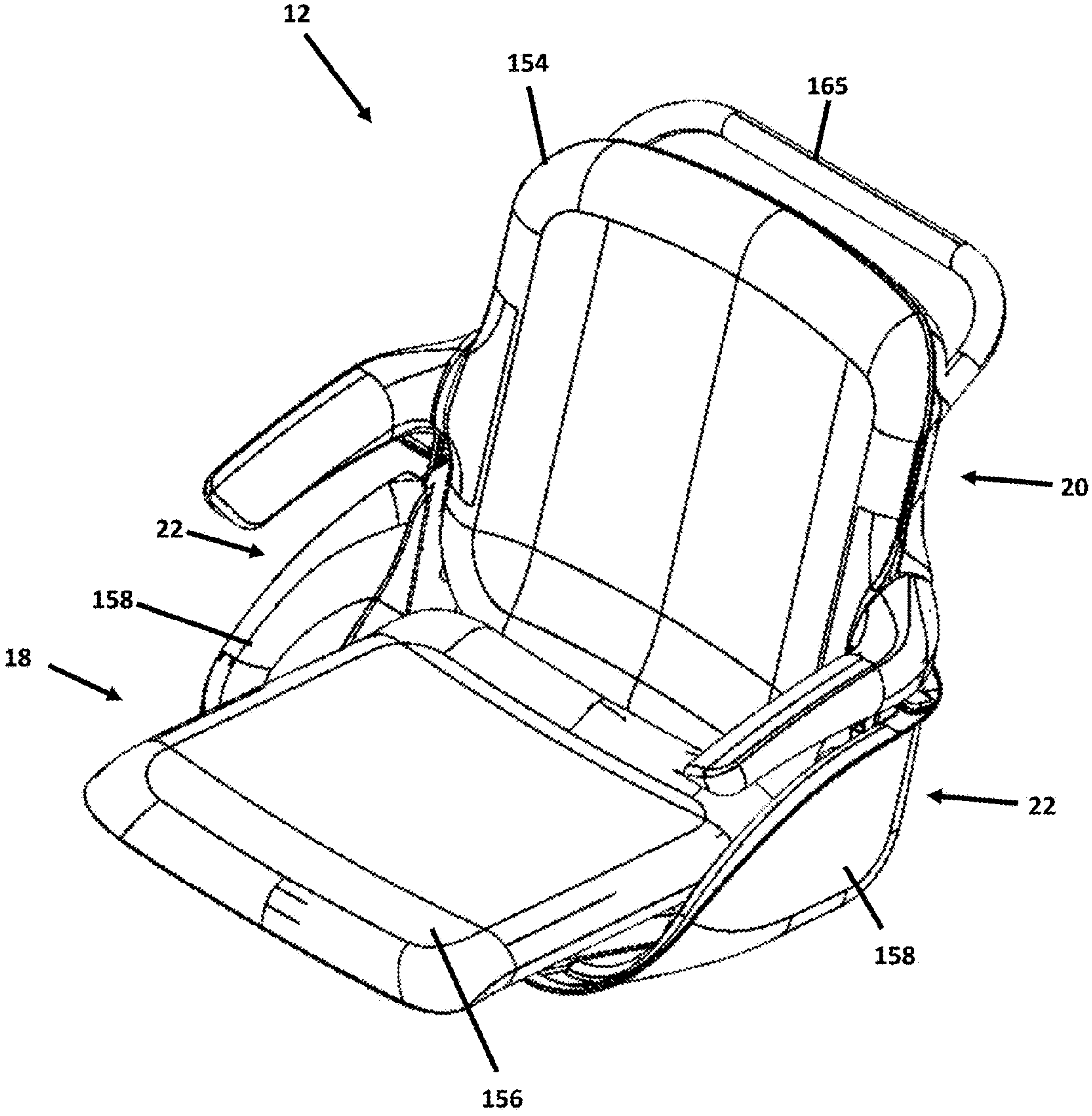
FIG. 17 is a front perspective view of the seat assembly of the wheelchair of FIG. 1.
Figure 18:
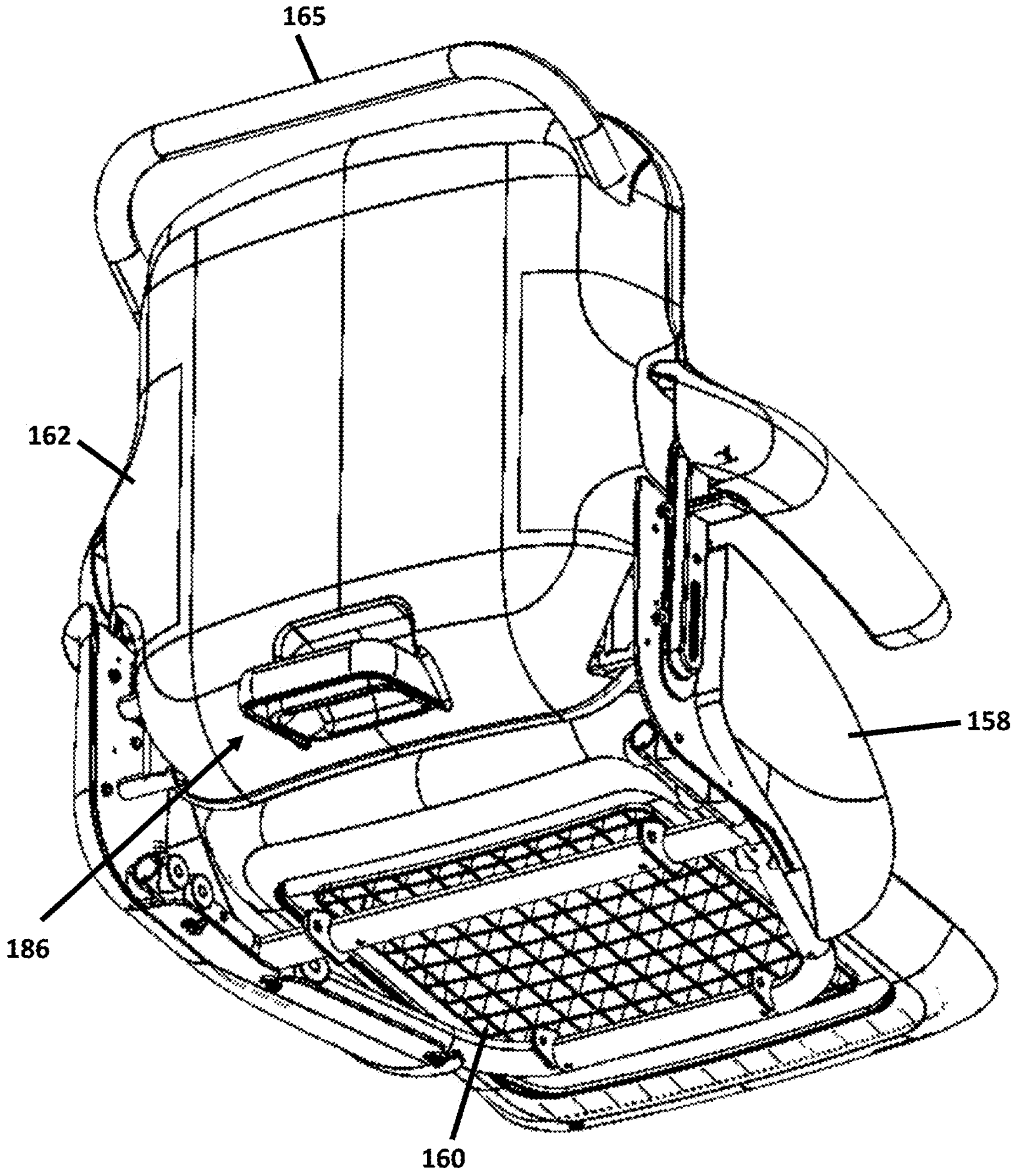
FIG. 18 is a rear perspective view of the seat assembly of FIG. 17.

Depicted in FIGS. 17-18 is an exemplary embodiment of a seat assembly 12. The seat assembly includes seat component 18, backrest component 20, and opposing side structures 22. Each of these may include, either individually or in combination, various paneling, padding, cushioning, upholstery, and the like to make the wheelchair 10 more aesthetically pleasing and/or comfortable to sit on. These aesthetic and/or comfort features are not limited to any particular embodiment, and may vary without departing from the scope of the present disclosure. In the embodiment shown, both the backrest component 20 and the seat component 18 include cushioning and upholstery on the sitting-side of the wheelchair (ref. nos. 154, 156). Further, paneling is provided on the opposing side structures (ref. no. 158), the rear side of the backrest component (ref. no. 160), and the underside of the seat component (ref. no. 162).

FIG. 13 depicts the seat assembly 12 with the cushioning, upholstery, and paneling removed. Here, it is shown that the backrest component 14 and the seat component 12 can each further include a frame 164, 166 for their respective cushioning, upholstery, and paneling to be attached to. These frames 164, 166 may impart rigidity to their respective components, and may enable these components 12, 14 to be connected to the opposing side structures 22. In the embodiment shown, the frames 164, 166 both include a curved, outer structural member 168, 170 and number of crossbars 172, 174 (one in the seat component and two in the backrest component) connected to them. Ideally, the crossbars 174 in the backrest component 14 may be curved or bent towards the rear to provide for a more ergonomic resting position for an individual's back.

Figure 19:
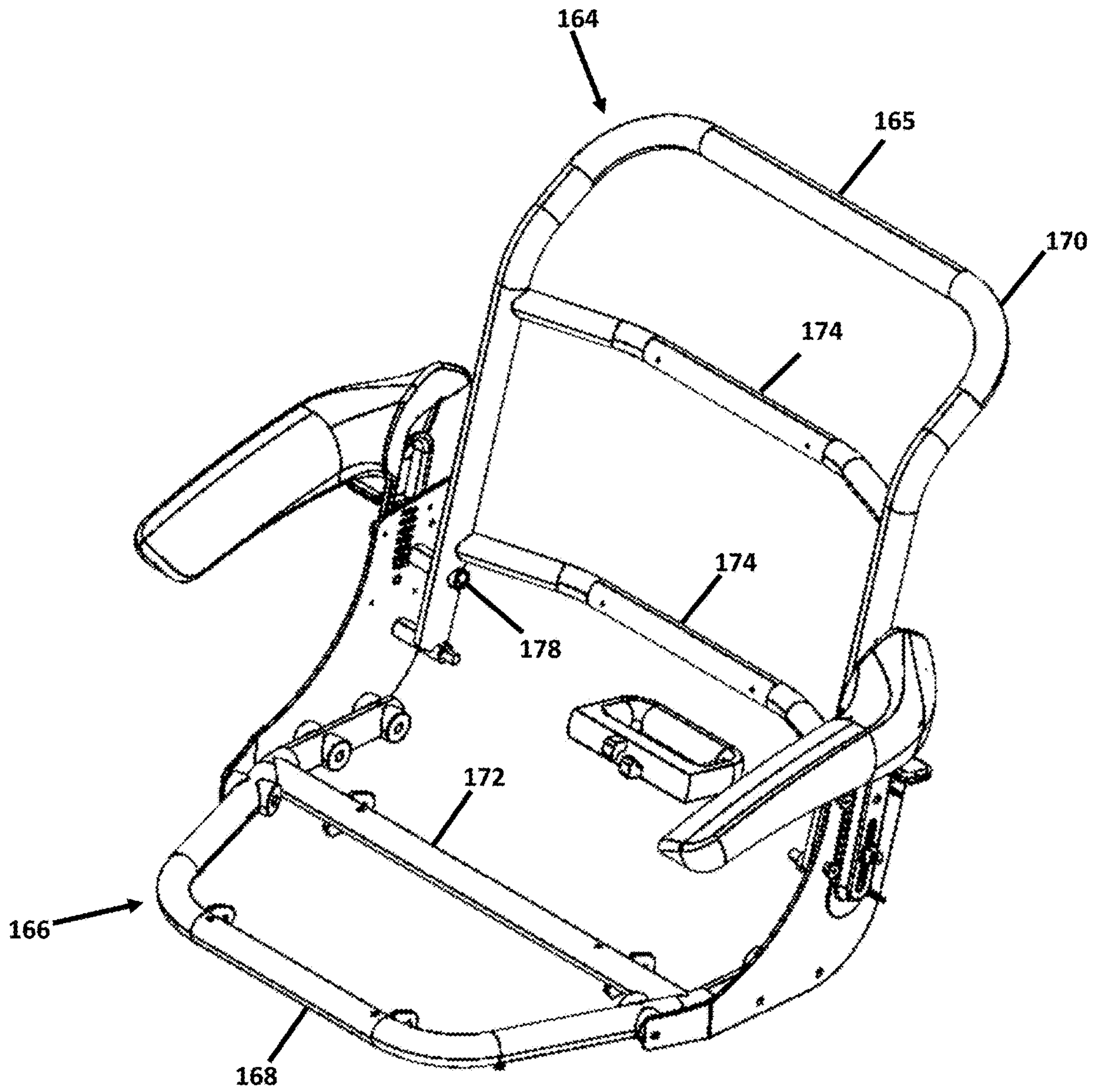
FIG. 19 is a front perspective view of the seat assembly of FIG. 17 without cushioning, upholstery, and paneling.
Figure 20:
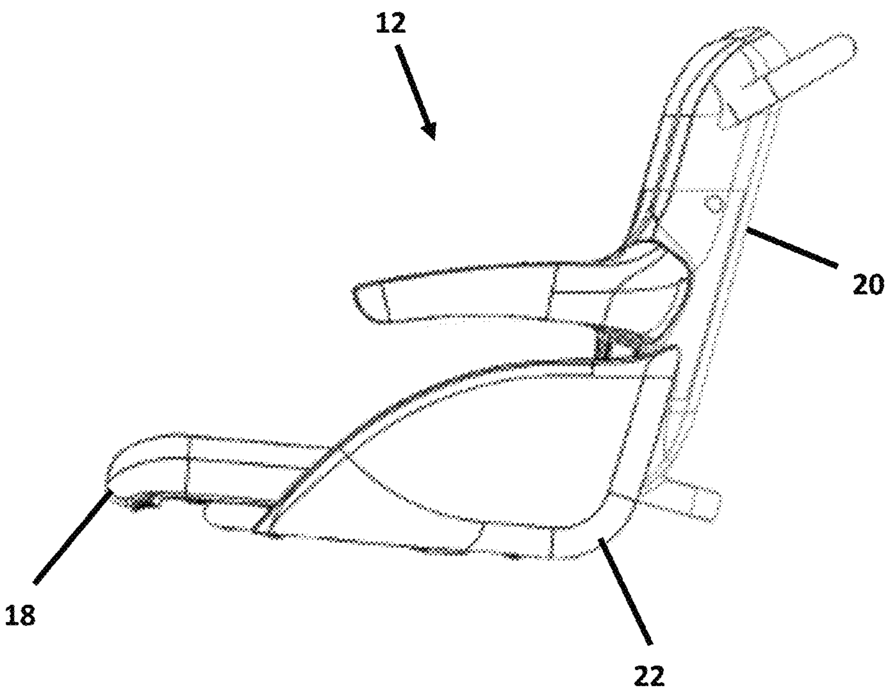
FIG. 20 is a side elevation view of the seat assembly of FIG. 17 with the backrest in a standard position.
Figure 21:
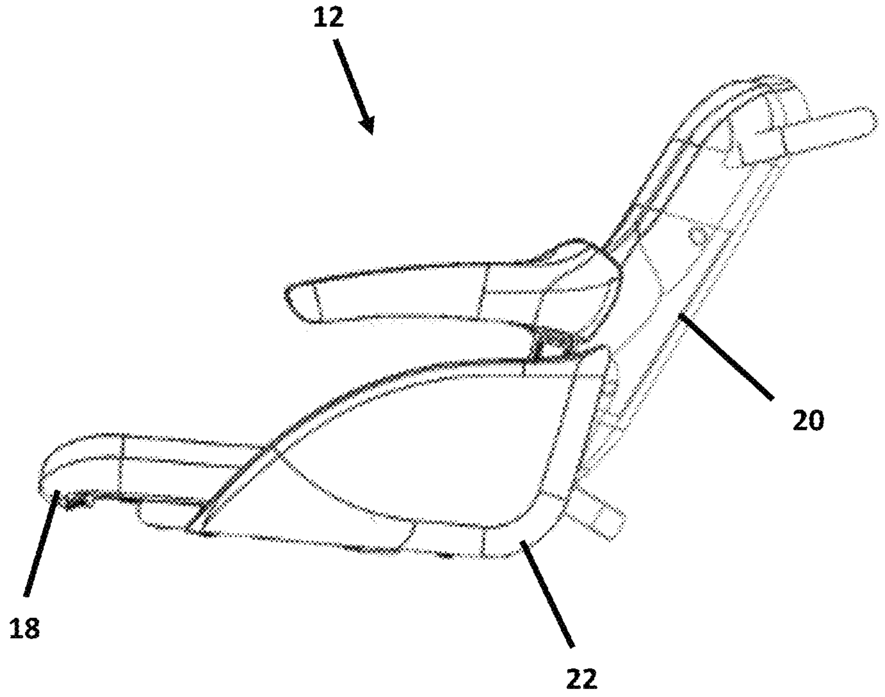
FIG. 21 is a side elevation view of the seat assembly of FIG. 17 with the backrest in a first reclined position.

As FIGS. 17-19 show, the cushioning, upholstery, and paneling of the backrest component may not cover/encompasses the entirety of the backrest component frame 164. Rather, the uppermost portion 165 of the outer structural member 170 of the backrest component frame 164 may remain uncovered and may protrude outwards from the rear of the backrest component 20 to function as a push-bar for maneuvering the wheelchair. However, those skilled in the art would appreciate that this design is not meant to be limiting. It is contemplated that in other embodiments, the frame 164 of the backrest component 20 may be entirely covered by aesthetic and/or comfort features, and that dedicated maneuvering features (e.g., handles and the like) may be incorporated as well (either in addition to or as an alternative for the push-bar of the present embodiment).

Figure 25:
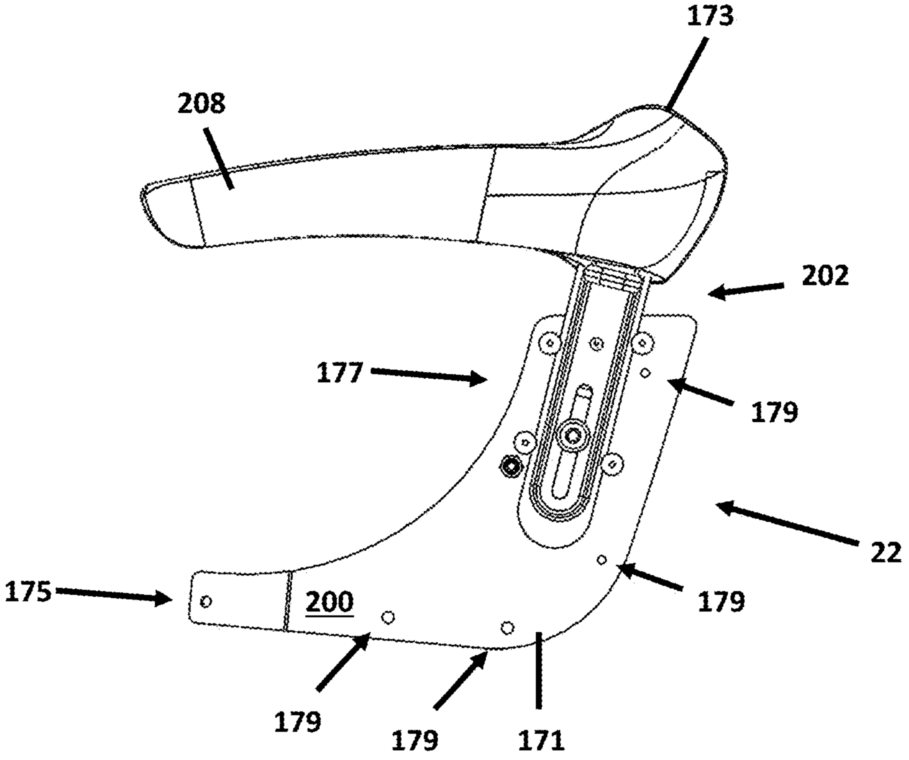
FIG. 25 is a side elevation view of a side structure of the wheelchair of FIG. 1.

Referring to FIGS. 25 and 25, the opposing side structures may include a bracket 171 and an armrest 173. The bracket 171 serves to secure the seat component 18 and the backrest component 20, and may feature any suitable design for doing so. Here, the bracket 171 features a generally curved, "J" shaped design with an elongated lower portion 175 for securing the seat component 18 and a wider upper portion 177 for securing the backrest component 20. Holes 179 provided on the bracket 171 may be used to interface with mechanical fasteners. The armrest 173 is attached to the bracket 171 and extends forward to provide a surface for an individual to rest his/her arm on. It is contemplated that a variety of armrest types may be utilized here, including fixed non-adjustable armrests and/or adjustable armrest assemblies 202 like that which is shown.

The opposing side structures 22 may be disposed near, and connected to, the rear of the seat component 18, and may extend vertically above the seat component 18. The backrest component 20 may be disposed in-between the opposing side structures 22. The bottom portion 176 of the backrest component 20 may be connected to the opposing side structures 22 by way of trunnion joints 178 (FIG. 19). In the embodiment shown, both trunnion joins 178 include a connecting pin inserted through a through-holes in the internal frame 166 of the backrest component 20 and received in a receiving hole defined in a side structure 22. It is contemplated that both connecting pins should be aligned on a common axis so that the overall backrest component 20 can freely pivot about the trunnion joints 178, thereby enabling the backrest component 20 to fold downwards towards the seat component 18 (FIG. 3-5), extend backwards to recline (FIGS. 15 and 16), and/or assume in any angular position (i.e., orientation) therebetween (FIG. 14). It is contemplated that the ability of recline further enhances the user experience of the wheelchair 10 by making it more comfortable to in, particularly for long periods of time.

Figure 23:
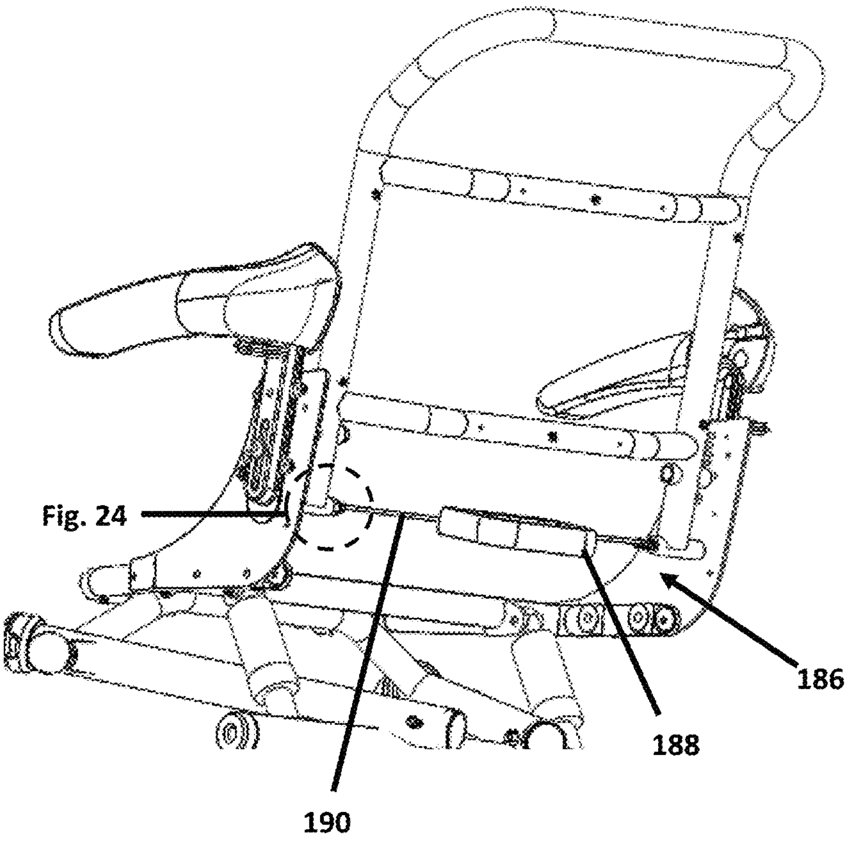
FIG. 23 is a rear perspective view of the seat assembly of FIG. 19.
Figure 24:
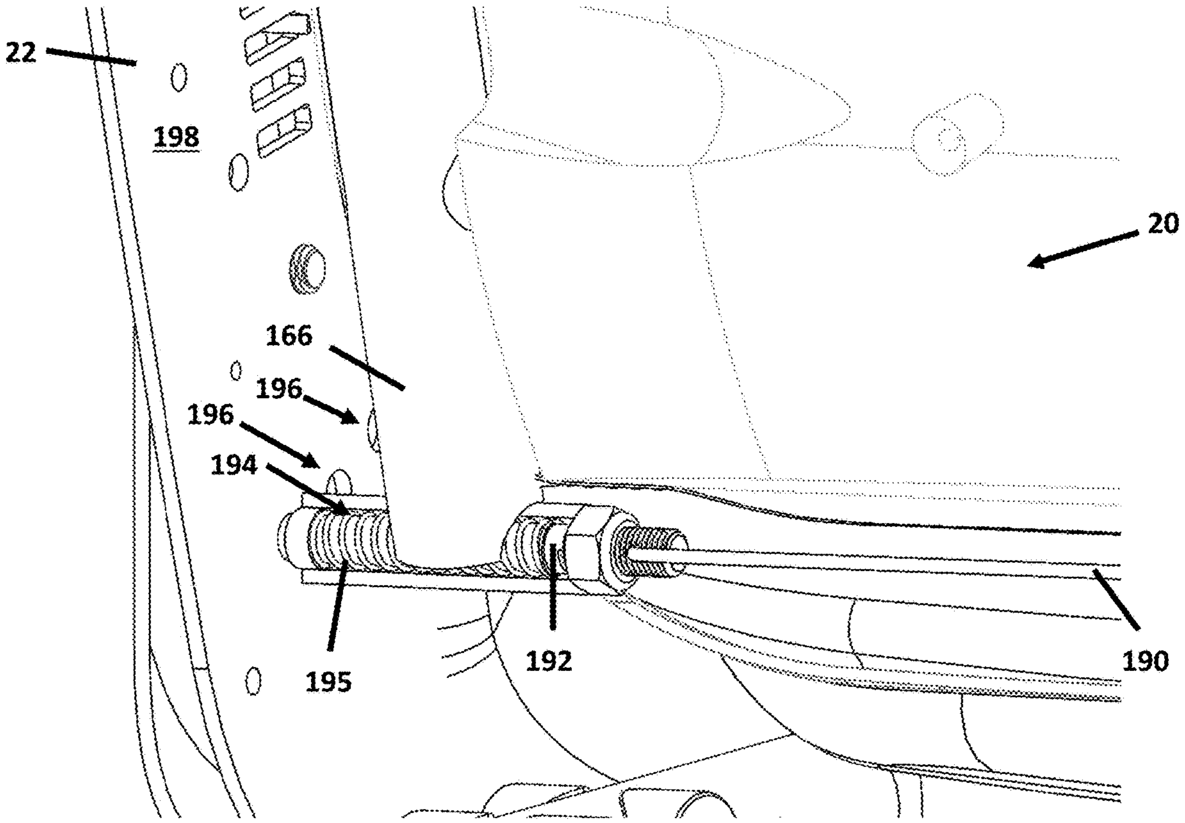
FIG. 24 is a close-up view of a portion the seat assembly of FIG. 23.

Referring to FIGS. 18, 23, and 24 the seat assembly 12 may also include a latch mechanism for locking the backrest component 20 into a particular angular position. In the embodiment shown, the seat assembly 12 includes a latch mechanism 186 incorporated into the backrest component 20. The latch mechanism 186 includes a pull handle 188 connected to the center portion of a drawstring 190. The ends of the drawstring are both connected to pins 192 that are housed within opposing channels 194 defined in the frame 166 of the backrest component 20. Both of these pins 192 are biased towards a side structure 22 by a spring 195 and may be received within a receiving hole 196 defined in the inside surfaces 198 of those side structures 22 (which prevents the backrest component 20 from pivoting) (best shown in FIG. 26). In operation, pulling the pull handle 188 causes the drawstring 190 to retract the pins 192 from their respective receiving holes 196 which thereby releases the backrest component 20 and allows it to pivot. Ideally, a side structure 22 would define a plurality of receiving holes 196 angularly displaced from one another relative to the trunnion joints 178, thereby enabling the backrest component 20 to be locked into multiple angular positions.

While the latch assembly 186 shown in FIGS. 12, 17, and 18 is exemplary, it is not meant to be limiting. It is contemplated that other types of latch mechanisms may be employed (e.g., sliding bolt locks).

Figure 26:
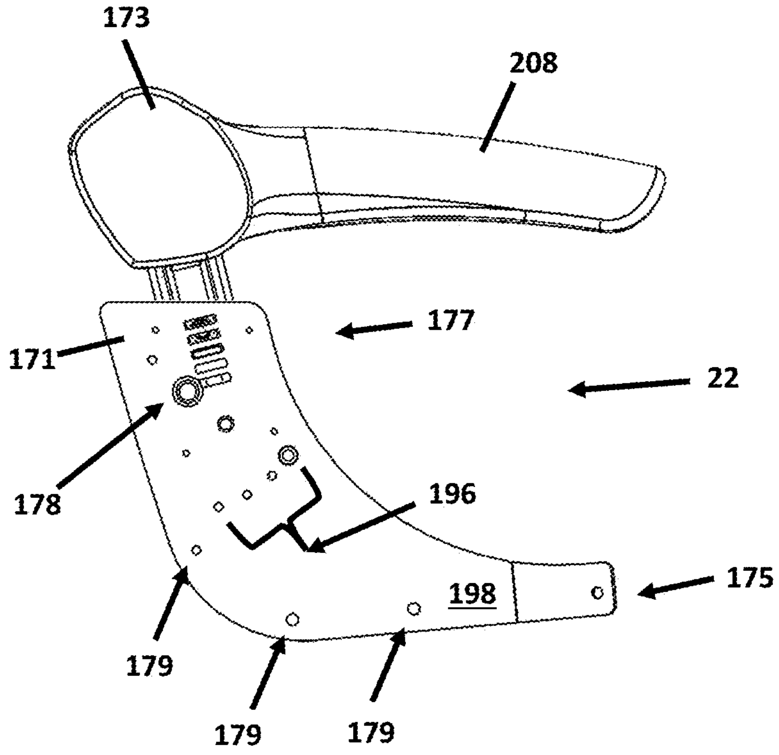
FIG. 26 is the opposing side elevation view of the side structure of FIG. 25.
Figure 27:
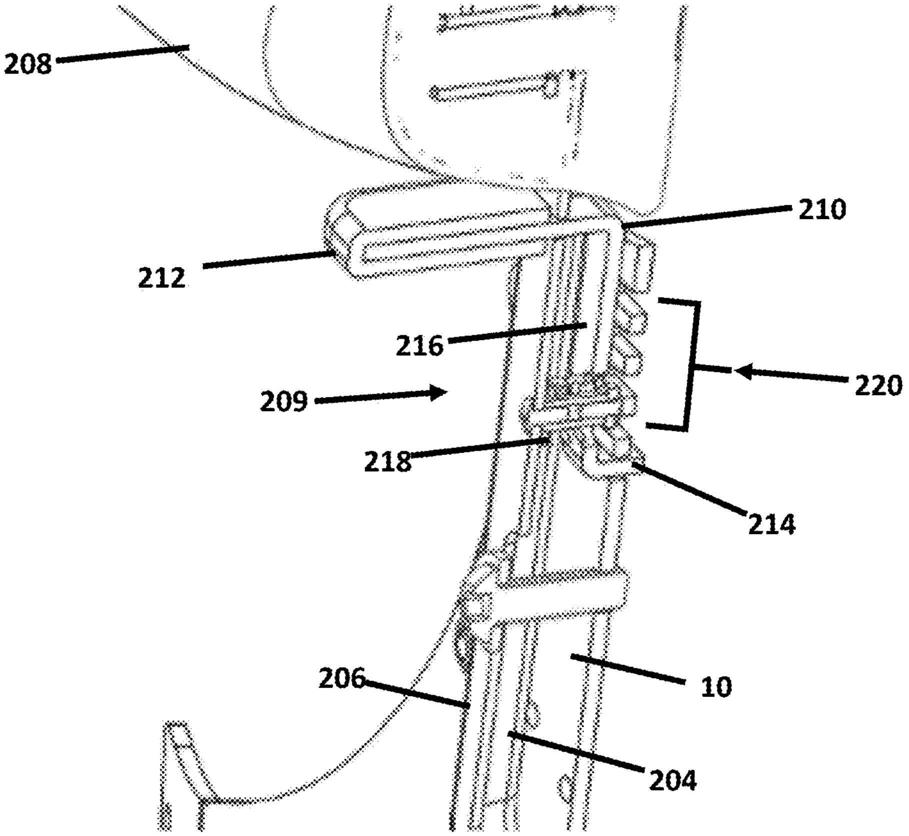
FIG. 27 is a cross-sectional view of the side structure of FIG. 25.

Referring to FIGS. 25-27, the armrests may be connected to the outside surface 200 of a side structure bracket 171. These armrests may include any suitable configuration of aesthetic and/or comfort features such as paneling, padding, cushioning, upholstery, and/or like. In the embodiment shown, the armrests are adjustable armrest assembles 202 that can be either raised or lowered. These adjustable armrests assemblies 202 include a mounting bracket 204 and an indexing member 206 connected to an armrest 208. The indexing member 206 is inserted into, and permitted to slide within, the mounting bracket 204. Further, the adjustable armrest assemblies 202 include a latch mechanism 209 that includes a "Z" lever 210 configured to lock the indexing member 206 into a particular vertical position. As shown, the lever includes a handle portion 212, a latch portion 214, and a center portion 216 disposed therebetween. The center portion 216 is biased towards the side structure 22 by a spring 218 which causes the latch portion 214 to be inserted into a slot 220 defined in the side structure 22, thereby locking the armrest 208 at a particular height. In operation, the handle portion 212 may be pulled to retract the latch portion 214 from a slot 220 which releases the indexing portion 206 and allows the armrest 208 to be raised or lowered as desired. Ideally, the side structure 22 would define a plurality of vertically aligned slots 220 so that the armrest 208 may be locked into multiple vertical positions.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A wheelchair comprising:
- a base assembly comprising:
  - a central frame comprising a forward portion and a rear portion;
  - a leg assembly comprising:
    - a leg comprising an elongated body that defines a top end and a bottom end;
    - a caster wheel subassembly connected to the bottom end of the leg;
  - a connecting means for connecting the top end of the leg to the forward portion of the central frame, wherein:
    - the connecting means provides for the movement of the leg between at least a first position and a second position;
    - the location of the caster wheel subassembly is further away from the central frame when the leg is in the first position than when the leg is in the second position; and
- a seat assembly disposed above and connected to the central frame.

2. The wheelchair of claim 1, wherein:
- the connecting means compromises a shaft, receiving channel, and a latch mechanism;
- the shaft is attached to the top end of the leg and the receiving channel is defined in the central frame;
- the shaft is inserted into the receiving channel to connect the leg assembly to the central frame; and
- the latch mechanism is configured to restrict telescopic movement between the shaft and the receiving channel.

3. The wheelchair of claim 2, wherein:
- the connecting means further comprises a hirth joint that comprises a first hirth coupling and a second hirth coupling;
- the first hirth coupling is provided on the shaft and the second hirth coupling is provided on the central frame;
- the hirth coupling is configured to lock the shaft into an angular orientation relative to the receiving channel when the first hirth coupling is coupled with the second hirth coupling.

4. The wheelchair of claim 2, wherein latch mechanism comprises a through-hole defined in the receiving channel, a receiving hole defined in the shaft, and a plunger pin inserted through the through-hole and the receiving hole.

5. The wheelchair of claim 1, wherein:
- the connecting means comprises a hinge that connects the top end of the leg to the central frame;
- the connecting means further comprises a sliding bolt lock that comprises a bolt, a lever connected to the bolt, and a receiving channel for the bolt;
- the bolt is housed within the top end of the leg and the receiving channel is defined in the central frame;

the lever is configured to move the bolt into and out of the receiving channel to engage and disengage the sliding bolt lock, respectively.

6. The wheelchair of claim 1, wherein the central frame comprises a suspension member connected to the seat component and to the central frame, wherein the suspension member is configured to support the seat component from below.

7. The wheelchair of claim 1, wherein:

the central frame comprises two longitudinal members that extend from the rear portion of the central frame to the forward portion;

the two longitudinal members are angled inwards along the rear portion and away from each other along the forward portion; and the connecting means connects the top end of the leg to one of the longitudinal members along the forward portion of the central frame.

8. The wheelchair of claim 1, wherein the leg assembly further comprises a footrest subassembly comprising a footrest and a front rigging that attaches the footrest to leg.

9. The wheelchair of claim 8, wherein the front rigging comprising a collar portion that is received over the leg, wherein the collar portion enables the entire leg assembly to pivot around the leg.

10. A wheelchair comprising:

a base assembly comprising:

a central frame comprising a forward portion and a rear portion;

a leg assembly comprising:

a leg comprising an elongated body that defines a top end and a bottom end;

a caster wheel subassembly connected to the bottom end of the leg;

a connecting means for connecting the top end of the leg to the forward portion of the central frame, wherein:

the connecting means provides for the movement of the leg between at least a first position and a second position;

the location of the caster wheel subassembly is further away from the central frame when the leg is in the first position than when the leg is in the second position;

a seat assembly comprising:

a seat component disposed above and connected to the central frame, the seat component comprising a forward portion and a rear portion;

a first side structure and an opposing second side structure, the first and second side structures being disposed near the rear portion of the seat component;

a backrest component disposed between the first side structure and the second side structure, the backrest component comprising a top portion and a bottom portion;

a first trunnion joint and a second trunnion joint, wherein the first and second trunnion joints connect the bottom portion of the backrest component to the first side structure and the second side structure, respectively, and wherein:

the first trunnion joint and the second trunnion joint enable the backrest to pivot between at least a first angular position and a second angular position; and the top portion of the backrest component is closer to the seat component when the backrest component is in the first angular position than in the second angular position; and a latch mechanism configured to lock the backrest in at least one of the first angular position and the second angular position.

11. The wheelchair of claim 10, wherein:

the latch mechanism comprises a pull handle connected to a drawstring, the drawstring comprising an end;

the end of the drawstring is connected to a pin that is housed within a channel defined in the backrest component;

the first side structure comprises a receiving hole for the pin;

the latch mechanism further comprises a spring that biases the pin towards the receiving hole such that, when the pin is received in the receiving hole the backrest component is locked into an angular position; and pulling the pull handle causes the drawstring to retract the pin from the receiving hole, thereby releasing the backrest component.

12. The wheelchair of claim 11, wherein:

the first side structure defines a plurality of receiving holes radially spaced from one another relative to the first trunnion joint;

each receiving hole of the plurality of receiving holes is configured to receive the pin and lock the backrest in a different angular position.

13. The wheelchair of claim 10, wherein the first trunnion joint and the second trunnion joint are both aligned along a common axis.

14. The wheelchair of claim 10, wherein the seat component comprises at least one of padding, cushioning, upholstery, and paneling.

15. The wheelchair of claim 10, wherein the backrest component comprises at least one of padding, cushioning, upholstery, and paneling.

16. The wheelchair of claim 10, wherein the at least one of the first and second side structures comprises at least one of padding, cushioning, upholstery, and paneling.

17. A wheelchair comprising:

a base assembly comprising:

a central frame comprising a forward portion and a rear portion;

a leg assembly comprising:

a leg comprising an elongated body that defines a top end and a bottom end;

a caster wheel subassembly connected to the bottom end of the leg;

a connecting means for connecting the top end of the leg to the forward portion central frame, wherein:

the connecting means provides for the movement of the leg between at least a first position and a second position;

the location of the caster wheel subassembly is further away from the central frame when the leg is in the first position than when the leg is in the second position;

a seat assembly comprising:

a seat component disposed above and connected to the central frame, the seat component comprising a forward portion and a rear portion;

a first side structure and an opposing second side structure, the first and second side structures being disposed near the rear portion of the seat component;

a backrest component disposed between the first side structure and the second side structure, the backrest component comprising a top portion and a bottom portion;

a first trunnion joint and a second trunnion joint, wherein the first and second trunnion joints connect the bottom portion of the backrest component to the first side structure and the second side structure, respectively, and wherein:

the first trunnion joint and the second trunnion joint enable the backrest to pivot between at least a first angular position and a second angular position; and the top portion of the backrest component is closer to the seat component when the backrest component is in the first angular position than in the second angular position a latch mechanism configured to lock the backrest in at least one of the first angular position and the second angular position; and a height-adjustable armrest assembly provided on the first side structure.

18. The wheelchair of claim 17, wherein:

the armrest assembly comprises an armrest, an indexing member, a mounting bracket, and a latch mechanism;

the mounting bracket is attached to the first side structure;

the indexing member is received within the mounting bracket and permitted to slide vertically therein;

the armrest is attached to the indexing member; and the latch mechanism is configured to lock the armrest at a vertical position.

19. The wheelchair of claim 18, wherein:

the latch mechanism comprises a lever, a spring, and plurality of vertically aligned slots defined in the first side structure;

the lever is connected to the indexing member and is biased towards the first side structure by the spring such that the lever is received within a slot in the first side structure; and compressing the spring retracts the lever from the slot, thereby releasing the indexing member.

20. The wheelchair of claim 10, wherein:

the connecting means compromises a shaft, receiving channel, and a latch mechanism;

the shaft is attached to the top end of the leg and the receiving channel is defined in the central frame;

the shaft is inserted into the receiving channel to connect the leg assembly to the central frame;

the latch mechanism is configured to restrict telescopic movement between the shaft and the receiving channel;

the connecting means further comprises a hirth joint that comprises a first hirth coupling and a second hirth coupling;

the first hirth coupling is provided on the shaft and the second hirth coupling is provided on the central frame; and the hirth coupling is configured to lock the shaft into an angular orientation relative to the receiving channel when the first hirth coupling is coupled with the second hirth coupling.

* * * * *